United States Patent [19]
Amini et al.

[11] Patent Number: 5,581,714
[45] Date of Patent: Dec. 3, 1996

[54] BUS-TO-BUS READ PREFETCH LOGIC FOR IMPROVING INFORMATION TRANSFERS IN A MULTI-BUS INFORMATION HANDLING SYSTEM (BUS-TO-BUS BRIDGE FOR A MULTIPLE BUS INFORMATION HANDLING SYSTEM THAT OPTIMIZES DATA TRANSFERS BETWEEN A SYSTEM BUS AND A PERIPHERAL BUS)

[75] Inventors: Nader Amini, Boca Raton; Ashu Kohli, Delray Beach; Gregory N. Santos, Boca Raton, all of Fla.

[73] Assignee: International Business Machines Corporation, Armonk, N.Y.

[21] Appl. No.: 473,659

[22] Filed: Jun. 7, 1995

Related U.S. Application Data

[62] Division of Ser. No. 68,877, May 28, 1993, Pat. No. 5,522,050.

[51] Int. Cl.$^6$ ..................................... G06F 13/00
[52] U.S. Cl. ........................................... 395/308; 395/285
[58] Field of Search ................................. 395/308, 200, 395/280, 285

[56] References Cited

U.S. PATENT DOCUMENTS

| | | | |
|---|---|---|---|
| 5,109,494 | 4/1992 | Ehlig et al. | 395/325 |
| 5,255,374 | 10/1993 | Aldereguia et al. | 395/325 |
| 5,315,706 | 5/1994 | Thomson et al. | 395/325 |
| 5,392,407 | 2/1995 | Heil et al. | 395/325 |
| 5,467,295 | 11/1995 | Young et al. | 395/200.05 |

OTHER PUBLICATIONS

Peripheral Component Inteconnect Revision 1.0 Jun. 22, 1992.

Primary Examiner—Jack B. Harvey
Assistant Examiner—David A. Wiley
Attorney, Agent, or Firm—Calfee Halter & Griswold

[57] ABSTRACT

A method and system for improving bus-to-bus data transfers in a multi-bus computer system is provided. The system includes a system bus having a slave device attached thereto, a peripheral bus having a master device attached thereto, and a host bridge connecting the two buses. The system bus permits burst read transfers of data stored in the slave device, wherein a single address phase is followed by several data phases, but only if the first address corresponds to a prescribed system bus boundary. The peripheral bus is not subject to address boundary limitations, instead permitting burst read transfers beginning at any address. The host bridge includes logic for decoding a first address asserted by the master device to determine if it corresponds to a system bus boundary. If it does not, the logic commences a first read pre-fetch non-burst transfer of a first set of data stored in the slave device beginning at the first address and ending at a system bus boundary, and temporarily stores this first set of data in a buffer. The logic then commences a second read pre-fetch burst transfer of a second set of data stored in the slave device corresponding to data stored between system bus boundaries, and temporarily stores this second set of data in the buffer, so that both of the temporarily stored first and second sets of data may be read by the master device over the peripheral bus in a single burst read transfer.

14 Claims, 11 Drawing Sheets

BUS-TO-BUS READ PREFETCH LOGIC FOR IMPROVING INFORMATION TRANSFERS IN A MULTI-BUS INFORMATION HANDLING SYSTEM (BUS-TO-BUS BRIDGE FOR A MULTIPLE BUS INFORMATION HANDLING SYSTEM THAT OPTIMIZES DATA TRANSFERS BETWEEN A SYSTEM BUS AND A PERIPHERAL BUS)

This is a divisional of U.S. patent application Ser. No. 08/068,877 filed on May 28, 1993, now U.S. Pat. No. 5,522,050.

RELATED APPLICATIONS

The following United States patent applications are incorporated herein by reference as if they had been fully set out:

U.S. patent application Ser. No. 08/068,477 Filed May 28, 1993 Entitled "DIRECT MEMORY ACCESS (DMA) CYCLE LOGIC FOR MULTIPLE BUS COMPUTER SYSTEM", now U.S. Pat. No. 5,300,712.

U.S. application patent Ser. No. 08/069,253 filed May 28, 1993 Entitled "ARBITRATION LOGIC FOR MULTIPLE BUS COMPUTER SYSTEM RELATED APPLICATIONS", now U.S. Pat. No. 5,396,602.

U.S. patent application Ser. No. 08/070,134 filed May 28, 1993 Entitled "METHOD AND APPARATUS FOR-INITIALIZING MULTIPLE BUS NETWORKS IN AN INFORMATION HANDLING SYSTEM";

U.S. patent application Ser. No. 08/069,230 filed May 28, 1993 Entitled "ERROR CAPTURE LOGIC FOR PERIPHERAL BUS IN MULTIPLE BUS COMPUTER SYSTEM", now U.S. Pat. No. 5,499,346.

U.S. patent Application Ser. No. 08/068,882 filed May 28, 1993 Entitled "METHOD AND APPARATUS FOR PROVIDING BACK-TO-BACK DATA TRANSFERS IN AN INFORMATION HANDLING SYSTEM HAVING A MULTIPLEXED BUS", now U.S. Pat. No. 5,448,703.

U.S. patent application Ser. No. 08/069,234 filed May 28, 1993 Entitled "METHOD AND APPARATUS FOR PROVIDING ACCURATE AND COMPLETE COMMUNICATION BETWEEN DIFFERENT BUS ARCHITECTURES IN AN INFORMATION HANDLING SYSTEM".

BACKGROUND OF THE INVENTION

The present invention relates generally to bridges for interconnecting buses in a multiple bus computer environment, and more particularly to a bridge into which is incorporated a buffer for synchronizing operations of different data management protocols of the interconnected buses, thereby optimizing data transfer efficiency between the buses.

Computer systems or information handling systems typically include more than one bus, each bus in the system having devices attached thereto which communicate locally with each other over the bus. For example, a typical computer system includes a system bus or CPU Local Bus to which a central processing unit (CPU) is attached and over which the CPU communicates directly with other devices attached to the system bus. The system may also include one or more peripheral buses, which connect peripheral devices, such as input/output devices (I/O) and graphics packages, to the computer system.

Generally, system buses and peripheral buses use a different set of standard protocols or rules to conduct data transfers between the different devices and components connected to them. These protocols are designed into the bus and are referred to as the "architecture" of the bus. Accordingly, communication problems result when data must be transferred between a peripheral device connected to a peripheral bus and the CPU or another system component connected to the system bus. Since different bus architectures are involved in such a data transfer, data being transferred from the first bus architecture may not be in a form which is useable or intelligible by the receiving second bus architecture.

Thus, a mechanism is needed to "translate" data that is transferred from one bus architecture to another. This translation mechanism is normally contained in the hardware of a bus-to-bus bridge (interface) through which the two different buses are connected. The bus-to-bus bridge connecting a system bus to a peripheral bus is normally called a host bridge. Accordingly, the host bridge connecting a system bus and a peripheral bus contains all the logic and hardware that translates communications between the two buses and ensures that data is transferred between the two buses intelligibly.

To permit system-wide communication between devices on different buses, bus-to-bus bridges have been designed to match the communications protocol of one bus with that of another. Known bus-to-bus bridges include those disclosed in the following patent applications assigned to the IBM Corporation: U.S. patent application Ser. No. 07/815,992 entitled "BUS CONTROL LOGIC FOR COMPUTER SYSTEM HAVING DUAL BUS ARCHITECTURE"; U.S. Pat. No. 5,313,627 issued May 17, 1994 entitled "PARITY ERROR DETECTION AND RECOVERY"; U.S. patent application Ser. No. 07/816,204 entitled "CACHE SNOOPING AND DATA INVALIDATION TECHNIQUE"; U.S. Pat. No. 5,255,374 issued Oct. 19, 1993 entitled "BUS INTERFACE LOGIC FOR COMPUTER SYSTEM HAVING DUAL BUS ARCHITECTURE"; U.S. patent application Ser. No. 07/816,691 entitled "BIDIRECTIONAL DATA STORAGE FACILITY FOR BUS INTERFACE UNIT"; U.S. patent application Ser. No. 07/816,693 entitled "BUS INTERFACE FOR CONTROLLING SPEED OF BUS OPERATION"; U.S. Pat. No. 5,265,211 issued Nov. 23, 1993 entitled "ARBITRATION CONTROL LOGIC FOR COMPUTER SYSTEM HAVING DUAL BUS ARCHITECTURE"; and U.S. patent application Ser. No. 07/816, 698 entitled "METHOD AND APPARATUS FOR DETERMINING ADDRESS LOCATION AT BUS TO BUS INTERFACE", all filed on Jan. 2, 1992. These applications describe mechanisms which permit system-wide communication of devices attached to different buses in the system.

Such bridges, however, do not solve the problems inherent with attempting to synchronize the inconsistent protocols of a system bus (such as an X86-type architecture bus) with a peripheral bus that uses Peripheral Component Interconnect (PCI) bus architecture or similar architectures. An example of such an inconsistency, is the different methods used by PCI buses and system buses to conduct a specialized data transfer called a sequential burst transfer.

A sequential burst transfer is a data transfer in which one address is provided during the address phase and several data phases occur thereafter. During the first data phase, the data is transferred into or out of the address provided in the address phase. During the subsequent data phases, the data transfers take place at the respective addresses that sequentially follow the address provided in the address phase (hereinafter sequential burst transfers shall be referred to simply as burst transfers).

The PCI burst protocol allows for the bursting of an unlimited number of data strings starting on any address boundary (assuming, of course, that PCI arbitration guidelines do not force the device initiating the burst to relinquish the bus). In contrast, the system bus burst protocol restricts the starting address for a burst transfer to certain address boundaries and allows only a certain number of data phases in a single burst transfer. Accordingly, the system bus architecture only permits a burst of four doublewords (DWORD's) or 16 bytes of data.

These restrictions in the system bus architecture, as well as others set forth below, require that the host bridge connecting a system bus and a PCI bus translate data transfers between the two different buses. The host bridge connecting a PCI bus to a system bus, however, must not only translate data between the two different architectures, but must perform this translation as efficiently as possible.

Thus, it is an object of the present invention to provide a bridge for interconnecting a CPU system bus and a bus that uses PCI bus architecture or a bus architecture having certain protocols that are similar to the PCI bus architecture in a multi-bus computer system while maximizing the data transfer efficiency between the interconnected buses.

SUMMARY OF THE INVENTION

According to the present invention, hardware logic within a host bridge that connects a system bus to a peripheral bus is using PCI bus architecture or a peripheral bus that uses a bus architecture similar to PCI is provided. The inventive hardware optimizes the speed at which data transfers are accomplished between the buses while translating the data transfers between the different architectures of the two buses.

DETAILED DESCRIPTION OF THE PREFERRED EMBODIMENT

Figure 1A:
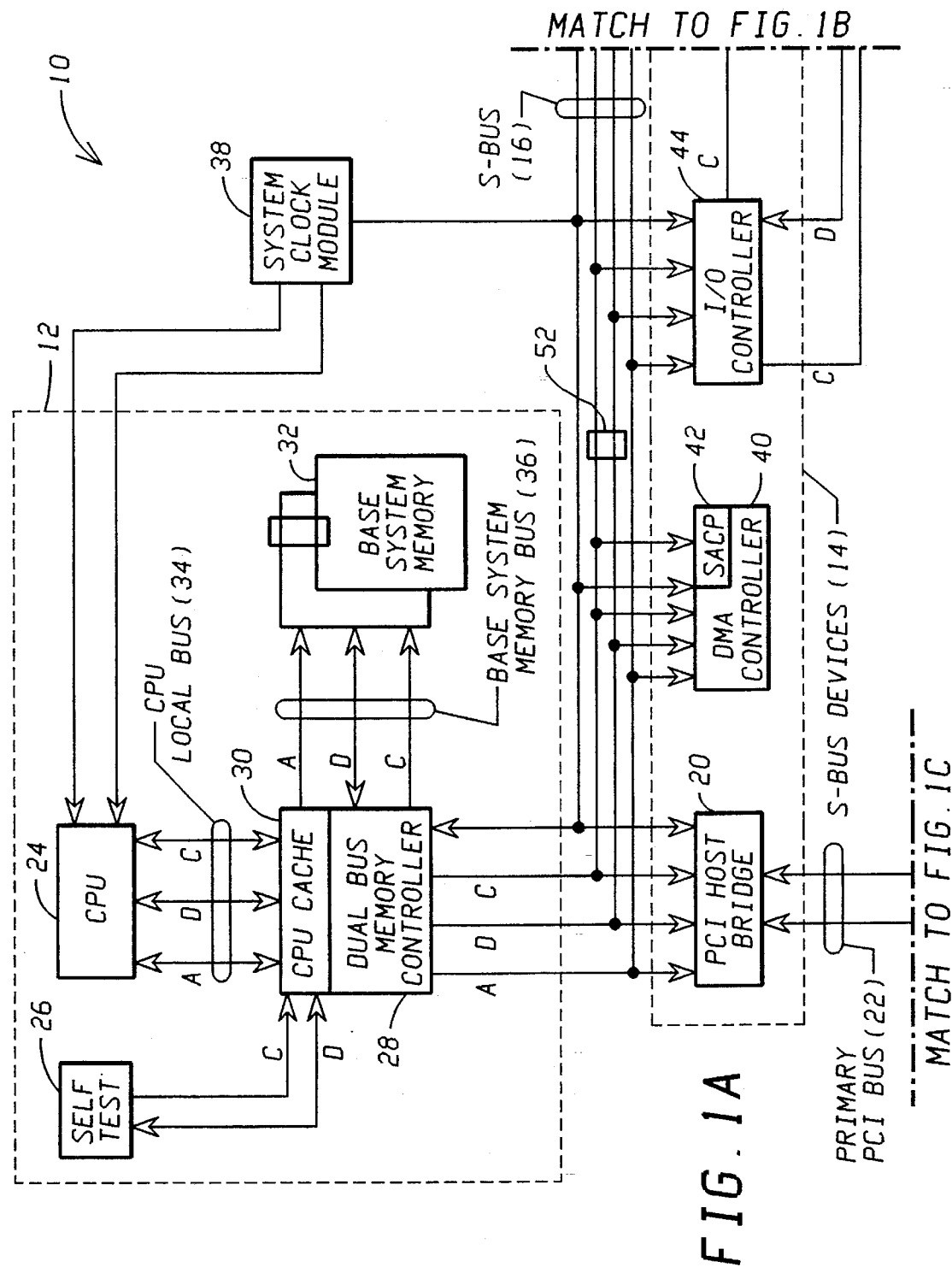
FIGS. 1A thorugh 1C, taken together, is a block diagram of an information handling system.
Figure 1B:
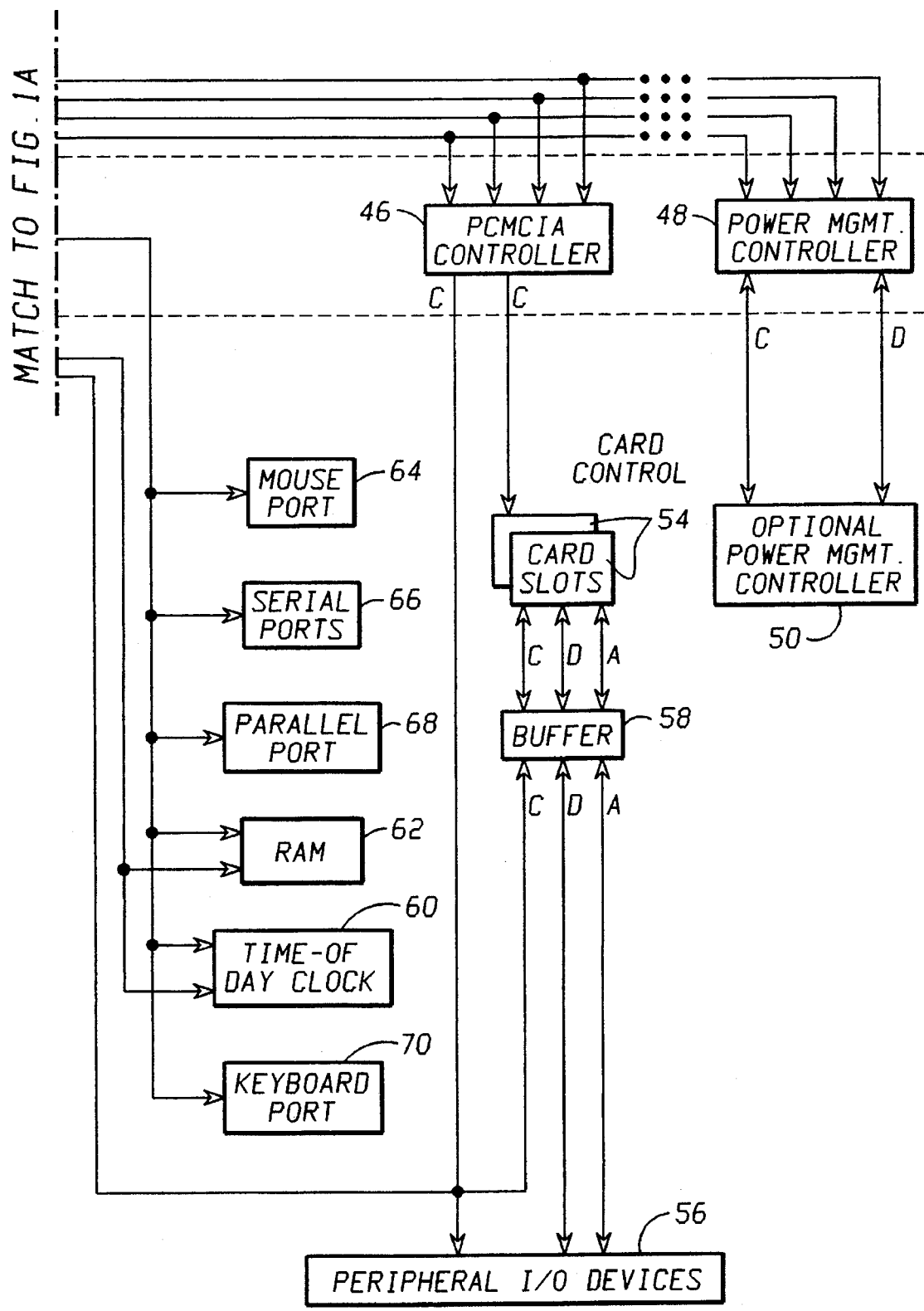
Figure 1C:
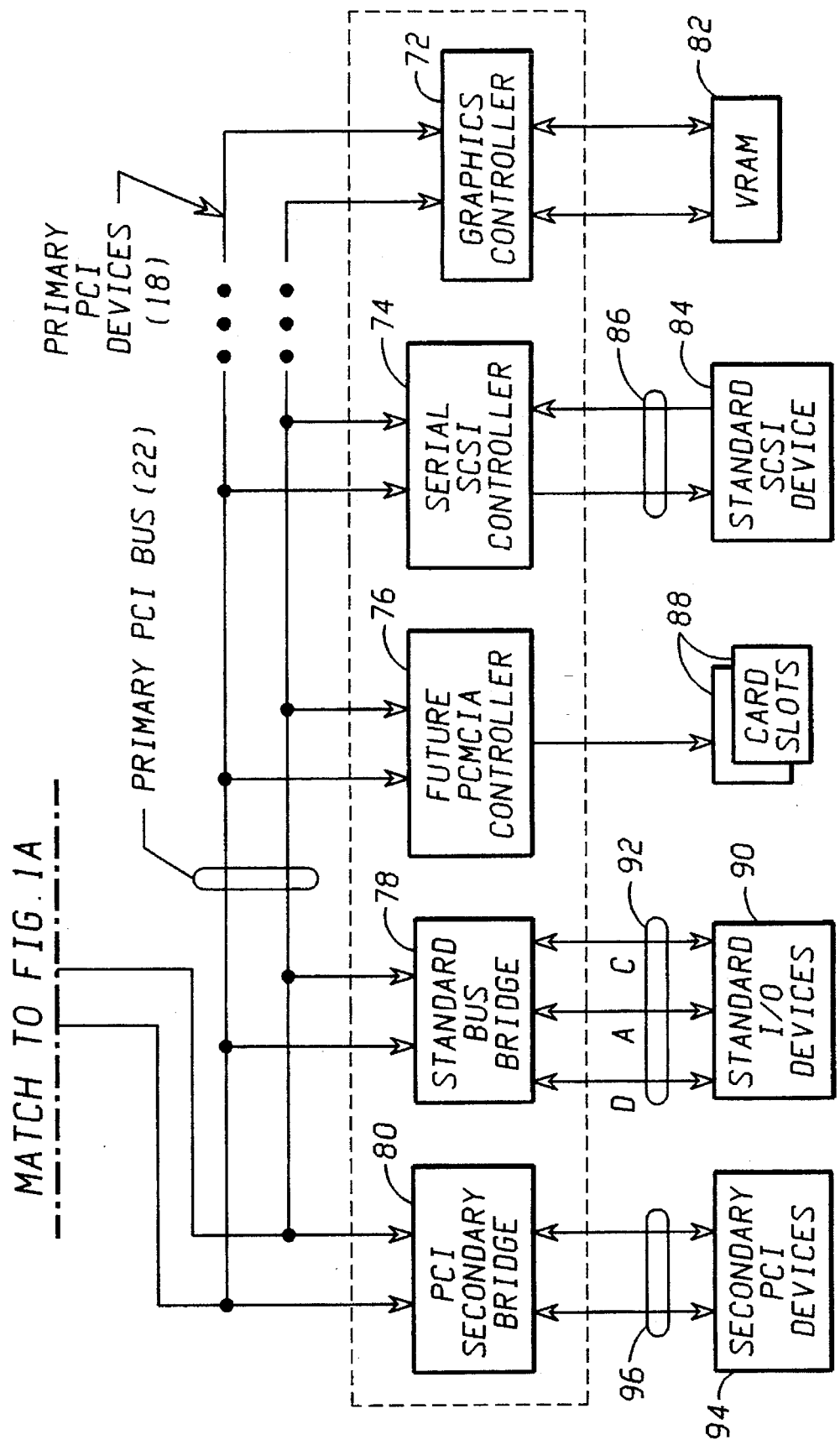

Referring now to FIGS. 1A–1C, collectively herein referred to as "FIG. 1", a multi-bus information handling system 10 is shown generally at 10, comprising, (i) a processor, cache and memory complex 12 connected to system bus (system bus) devices 14 via system bus (system bus) 16 and (ii) primary PCI devices 18 attached to one of the system bus devices, a primary PCI host bridge 20, via a primary PCI bus 22. More detailed descriptions of the processor, cache and memory complex 12, the system bus devices 14, the primary PCI devices 18, and the other elements shown in FIG. 1 will be provided hereinafter.

The processor, cache and memory complex 12 comprises a central processing unit (CPU) 24, a self-test circuit 26, a memory controller 28, a CPU cache 30, and base system memory 32. The CPU 24 in the preferred embodiment is a 32-bit microprocessor available from Intel, Inc. under the trade designation i486™, although it is contemplated that the system 10 may be implemented using other types of CPUs, especially other X86-type microprocessors. The self-test circuit 26 provides a built-in-self-test (BIST) feature for the CPU 24 upon power-up. The self-test circuit also controls any self-test features which may be incorporated within each of the system bus devices 14.

The CPU 24 is connected to the self-test circuit 26 and the memory controller 28 by a CPU local bus 34. The memory controller 28 is connected to the base system memory 32 by means of a base system memory bus 36. The memory controller 28 controls read and write operations to base system memory 32 over the base system memory bus 36, which operations are initiated by either the CPU 24 over the CPU local bus 34, or by a system bus device 14 over the S-bus 16. Because the memory controller has the capability to manage operations on two buses, operations over the base system memory bus 36 and the CPU local bus 34 may be managed simultaneously. The S-bus 16, the base system memory bus 36, and the CPU local bus 34 are 32-bit buses, each of which buses comprises data, address and control information paths ("D", "A", and "C" in FIG. 1) as is typical of such buses.

Base system memory 32 provides system-wide storage capability and may comprise either non-interleaved or interleaved memory cards. The CPU cache 30 permits short term storage of information contained within either base system memory 32 or expansion memory located elsewhere within the system 10. Such expansion memory could, for example, be located on the peripherally attached I/O devices within the system. The CPU cache 30 incorporates random access memory (RAM, not shown) which is used to temporarily stores address locations of the base system memory 32 which are frequently accessed by the CPU 24. The CPU 24 accesses information stored in the CPU cache 30 directly, whereas access to information stored in the base system memory 32 must be handled by the memory controller 28.

All access to base system memory 32 is controlled by the memory controller 28 via base system memory bus 36. The memory controller initiates system memory cycles to the base system memory 32, during which cycles either the CPU 24 or one of the system bus devices 14 has access to the base system memory via the memory controller 28. During a memory cycle directed to it, the memory controller 28 responds to the memory cycle. However, if the memory cycle is not directed to the memory controller 28, the information passes onto S-bus 16. If the memory controller 28 determines that the operation it is managing is an I/O cycle, the memory controller propagates the information onto the S-bus 16 for access thereto by a system bus device. If the I/O cycle is destined for a system bus device, the appropriate system bus device responds with a decode command to the memory controller. If the I/O operation is destined for a primary PCI device 18, the PCI host bridge 20 responds with a decode command to the memory controller and passes the I/O cycle to the appropriate primary PCI device.

A system clock module 38 provides a single clock signal for the system bus devices 14, and a pair of clock signals for the CPU 24. In the preferred embodiment, the clock signal provided to the system bus operates at 33 MHz. The two signals provided to the CPU 24 operate at 33 MHz and 66 MHz, respectively. The CPU 24 requires two clock signals because it operates internally at 66 MHz, but communicates over the CPU local bus 34 at 33 MHz.

Communications between the processor, cache and memory complex 12 and the system bus devices are managed by the memory controller 28 over the 32-bit S-bus 16. Also attached to the system bus, as shown in the preferred embodiment of FIG. 1, are a direct memory access (DMA) controller 40, a system arbitration control point (SACP) 42, an input/output (I/O) controller 44, a PCMCIA controller 46, and a power management controller 48. An optional power management controller 50 may be attached to the power management controller 48 in case more sophisticated power management control is desired. A buffer 52 is provided on the S-bus 16 intermediate the DMA controller 40 and the I/O controller 44. As shown in FIG. 1, however, it is contemplated that other system bus devices 14, beyond those shown, may be attached to the S-bus 16.

The PCMCIA controller 46 is attached directly to PCMCIA card slots 54. Peripheral I/O devices 56 may be connected to the PCMCIA card slots 54 by means of buffers 58. The peripheral I/O devices 56 are controlled by the I/O controller 44. Attached to the I/O controller 44 are a time-of-day clock 60 and a RAM module 62. The I/O controller 44 supports a variety of ports, including a mouse port 64, serial ports 66, a parallel port 68, and a keyboard port 70.

In addition to supporting system bus devices 14 on the S-bus 16, the system 10 also supports a second high speed, high bandwidth bus, which in the preferred embodiment is the primary PCI bus 22. PCI bus 22 is capable of performing significant data transfer in a relatively short period of time (up to 120 megabytes of data per second). The PCI bus achieves this high level of performance, in part, because it may be directly linked to other high speed buses, such as system buses to which a CPU may be connected, and thus may provide for rapid transfer of data between devices attached to the PCI bus and devices attached to the system bus. In fact, the operation of several high integration devices, such as certain graphics package controllers, require a direct link to a system bus through a high performance bus such as the PCI bus. In addition, the PCI bus architecture does not require any "glue logic" to operate peripheral devices connected to it. Glue logic for other buses typically consists of miscellaneous hardware components such as a decoders, buffers or latches that are installed intermediate the peripheral devices and the bus.

The primary PCI bus operates on a synchronous clock signal of 33 MHz, and the strings of data transmitted over the PCI bus are 32 bits long. A 32-bit data string on the PCI bus is called a double word (DWORD), which is divided into 4 bytes each comprised of 8 bits of data. The address and data information carried by the PCI bus are multiplexed onto one signal. Multiplexing eliminates the need for separate address and data lines, which in turn, reduces the amount of signals required in a PCI bus environment as opposed to other bus architectures. The number of signals required in PCI bus architecture is between 45–47 while non-multiplexed buses typically require twice this number. Accordingly, because the number of signals are reduced, the number of connection pins required to support a device linked to the PCI bus is also reduced by a corresponding number. PCI architecture is thus particularly adapted for highly integrated desktop computer systems.

A more detailed description of the structure and operation of PCI bus architecture is provided in "Peripheral Component Interconnect (PCI) Revision 1.0 Specification", published Jun. 22, 1992; "Preliminary PCI System Design Guide", revision 0.6 published Nov. 1, 1992; "Peripheral Component Interconnect (PCI) Add-in Board/Connector Addendum", (Draft) published Nov. 6, 1992; and, "Peripheral Component Interconnect (PCI) Revision 2.0 Specification" published Apr. 30, 1993, all by the PCI Special Interest Group, the contents of which references are incorporated herein by reference as if they were fully set forth.

Primary PCI devices 18 in the system 10 communicate with each other over the primary PCI bus 22. Primary PCI devices communicate with the CPU, cache and memory complex 12 and with other system bus devices 14 residing on the S-bus 16 by means of the PCI host bridge 20, which is itself a system bus device residing on the system bus. The PCI host bridge 20, then, serves as an interface between the S-bus 16 and the primary PCI bus 22 and provides an effective means of communication between these two buses, and any peripheral devices which may be attached to these buses.

The PCI host bridge 20 is a low latency interconnect mechanism through which the CPU 24 or other system bus device 16 may directly access the primary PCI devices 18 or devices attached thereto. The bridge 20 also provides a high performance path which allows the primary PCI devices or devices attached thereto quick and direct access to base system memory 32. In addition, the host bridge 20 provides all of the hardware required to provide an interface between the S-bus 16 and the primary PCI bus 22 so that data may be transferred between these buses.

An alternate configuration of information handling system 10 eliminates S-bus 16 so that host bridge 20 connects Primary PCI bus 22 directly to the CPU Local Bus 34. In this configuration any of the S-bus devices 14 could be connected to CPU local bus 34. Since S-bus 16 and CPU Local Bus 34 operate using the same architectures, the translation functions performed by the invention, as described below, are the same in this alternate configuration as the preferred embodiment.

The primary-PCI bus 22 is capable of supporting a variety of devices which are PCI compatible. As shown in FIG. 1, these devices may include a graphics controller 72, a serial SCSI (small computer systems interface) controller 74, a future PCMCIA controller 76, a standard I/O bus (e.g., ISA or MICRO CHANNEL® ("MC-A")) bridge 78 (also referred to herein as an expansion bridge), and a PCI secondary bridge 80. The devices shown in FIG. 1 attached to the primary PCI bus 22, however, are only one example of a system implementing a PCI bus architecture, and thus, the disclosed exemplary configuration and is not intended to limit the invention in any way.

The graphics controller 72 is typically provided with memory capability in the form of VRAM 82, which enables the graphics controller to buffer video frames therein, and may control any known graphics package which may be supported by PCI bus architecture. The SCSI controller 74 serves as an interface between SCSI devices 84 attached to a SCSI bus 86 and the primary PCI bus 22, and may control any SCSI device which may be supported by PCI bus architecture. The future PCMCIA controller 76 is attached to and controls card slots 88.

The standard bus bridge 78 serves as an interface between I/O devices 90 attached to a standard (e.g., MC-A . or ISA) bus 92 and the primary PCI bus 22. Secondary PCI devices 94 are connected to PCI secondary bridge 80 via secondary PCI bus 96. Any number of unidentified secondary PCI devices 94 may then be connected to the secondary PCI bus 96. The PCI secondary bridge 80 serves as an interface between the secondary PCI devices 94 attached to the secondary PCI bus 96, and the primary PCI bus 22.

Any number of peripheral devices compatible with the PCI bus architecture may be arranged on the primary PCI bus 22 with no other PCI buses present in the entire computer system 10; or any number of PCI peripheral devices could be attached to the primary PCI bus 22 with any number of secondary PCI buses, in addition to PCI bus 96, attached through the same number of separate, respective PCI bridges 80 to the primary PCI bus 22. Each secondary PCI bus could also have any number of additional PCI buses attached through PCI bridges to it and these "tertiary" PCI buses could have further PCI buses attached to them in various combinations. Similarly each PCI bus could have any number of PCI devices attached to it. Each connection between two PCI buses must be through a PCI bridge identical to bridge 80.

Furthermore, it is possible that a plurality of bridges identical to PCI host bridge 20 could be driven by the S-bus 16. Each of these host bridges could then have any number of PCI buses, bridges and devices connected to them in any arrangement that the designer of system 10 wishes. Thus, the portion of system 10 that is comprised of PCI bus architecture may be comprised of multiple buses and PCI peripheral devices arranged in various peer and hierarchical combinations (referred to hereinafter generally as a PCI network).

The PCI host bridge 20 of the present invention provides a mechanism for interconnecting the CPU local bus and the PCI bus to maximize the data transfer efficiency between the interconnected buses. Because the communication protocols of these two buses differ, logic is provided which provides an effective bus-to-bus interface, as will be further explained below.

Figure 2:
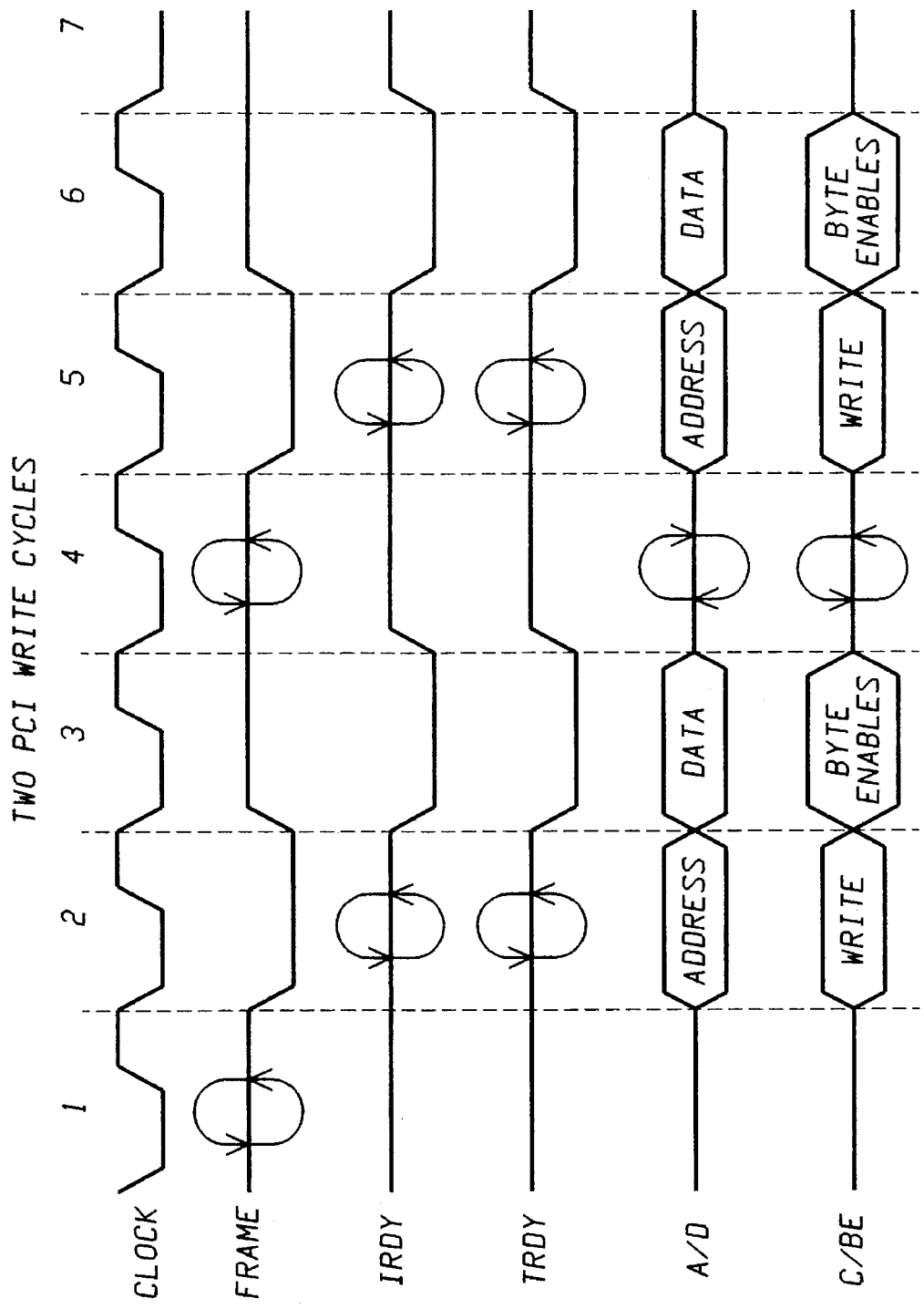
FIG. 2 is a timing diagram of various signals carried by the peripheral bus of the system of FIGS. 1A through 1C through a write operation.

FIG. 2 is a timing diagram of various PCI bus signals which occur over the PCI bus 22 during two consecutive write cycles to a peripheral device attached to primary PCI bus 22. This peripheral device could be graphics controller 72, standard bus bridge 78 or any other peripheral device that can be driven from a PCI bus. Similarly, the write cycles shown in FIG. 2 are typical PCI bus write cycles and are not unique to primary PCI bus 22. They could be write cycles on secondary PCI bus 96 or any other PCI bus in the PCI network.

The clock signal (CLOCK) provides the timing for all communications on the PCI network. CLOCK is an input to every PCI device and all PCI bridges. CLOCK is synchronous, meaning that all communication signals in PCI architecture have a duration of at least one clock and any commands or data transfers are executed over the period of at least one clock. The signals in FIG. 2 are separated into individual "clocks" or "phases" by the vertical dashed lines. Each dashed line represents the beginning of one clock duration and the end of the immediately preceding clock duration. The signals on each line are sampled or have their effective meaning on the rising edge of the clock signals.

The frame signal (FRAME) is used by any PCI bridge or peripheral device connected to the PCI bus to indicate that it is initiating a communication cycle, or an access, to another PCI bridge or peripheral device connected to the bus. The peripheral device or PCI bridge initiating an access is called a master. The device or component to which the access is directed is called a slave or target. FRAME is a negative active signal. Thus, when a master drives the FRAME low as shown in clock No. 2, a master is indicating to a slave that it is initiating an access.

The initiator ready signal (IRDY) is also negative active and indicates when the master is ready for a data transfer to begin. Thus, the master drives IRDY low when it is ready to accept data during a read cycle or transfer data to the slave during a write cycle.

The target ready signal (TRDY) is activated low and indicates when a slave is ready for a data transfer to begin. Thus, the slave drives TRDY low when it is ready to accept data from the master during a write cycle or to transfer data to the master during a read cycle.

The address/data signal (AD) carries both the address of a register to which a data transfer is targeted and the data that is to be transferred multiplexed on one line. The address information is driven on AD by the master during an address phase when it asserts FRAME. Depending upon whether the access is a write cycle or a read cycle, during a data phase, the master or slave, respectively, will provide the data that is then driven on AD after the address phase. The address phase has the duration of one clock, and the data phase is at least one clock but can be more than one clock if the data transfer is delayed by the assertion of IRDY by the PCI master or TRDY by the slave.

The command/byte enable signal (C/BE) provides PCI bus commands and byte enable signals multiplexed on one line. A bus command is asserted by the master when it asserts FRAME and during the address phase on AD. The bus command can either be a read or a write command depending upon which type of access the master is initiating.

The byte enable signals are present on C/BE during the data transfer on AD. The byte enable signals consist of four bits. When all of these four bits are activated low, they indicate that all four bytes or all 32 bits of data being transferred on AD are enabled. Enabled data is normal, intelligible data. When one of the four bits is a high, then one of the four bytes of data being transferred on the PCI bus is not enabled, meaning that particular byte of data is unintelligible and should be ignored by the devices or components receiving or transmitting the data string.

The function of the various PCI bus signals during the simple write operation as shown in FIG. 2 is as follows:

During the second clock, a master drives FRAME low which means the master is initiating an access to a slave. IRDY and TRDY are in a turn around cycle during the second clock.

At this time, the master provides the address of the register in the slave to which the access is targeted on the AD line. Simultaneously, a write command is generated by the master on the C/BE line.

Moving on to the third clock, FRAME is deasserted, which means the access is ready to be completed. The master now has gained control of the IRDY line and drives it low, indicating the master is ready to transfer data to the slave. The slave has also gained control of the TRDY line and activates it low, indicating that it has decoded the address information as an address of a register within itself and is ready to accept data in that register. Thus, on the third clock, data is transferred on the AD line from the master into the slave in its decoded register.

When the data is transferred, the C/BE line asserts its byte enable signals indicating whether the data is enabled. If one or more of the four bits are high, then the corresponding byte of data on the AD line is not enabled.

During the fifth clock the timing diagram repeats itself since another write cycle has been initiated. This second write cycle could be initiated by the same master or a different one. Similarly, the target of the write cycle could be the same slave or an entirely different one.

To eliminate any risk of contention between various devices connected to the PCI bus, each line goes through a turnaround cycle before the second write cycle is initiated. For a complete explanation of turnaround cycles and contention, see a co-pending application assigned to I.B.M. Corp., entitled "METHOD AND APPARATUS FOR PROVIDING BACK-TO-BACK DATA TRANSFERS IN AN INFORMATION HANDLING SYSTEM HAVING A MULTIPLEXED BUS", filed concurrently herewith.

Figure 3:
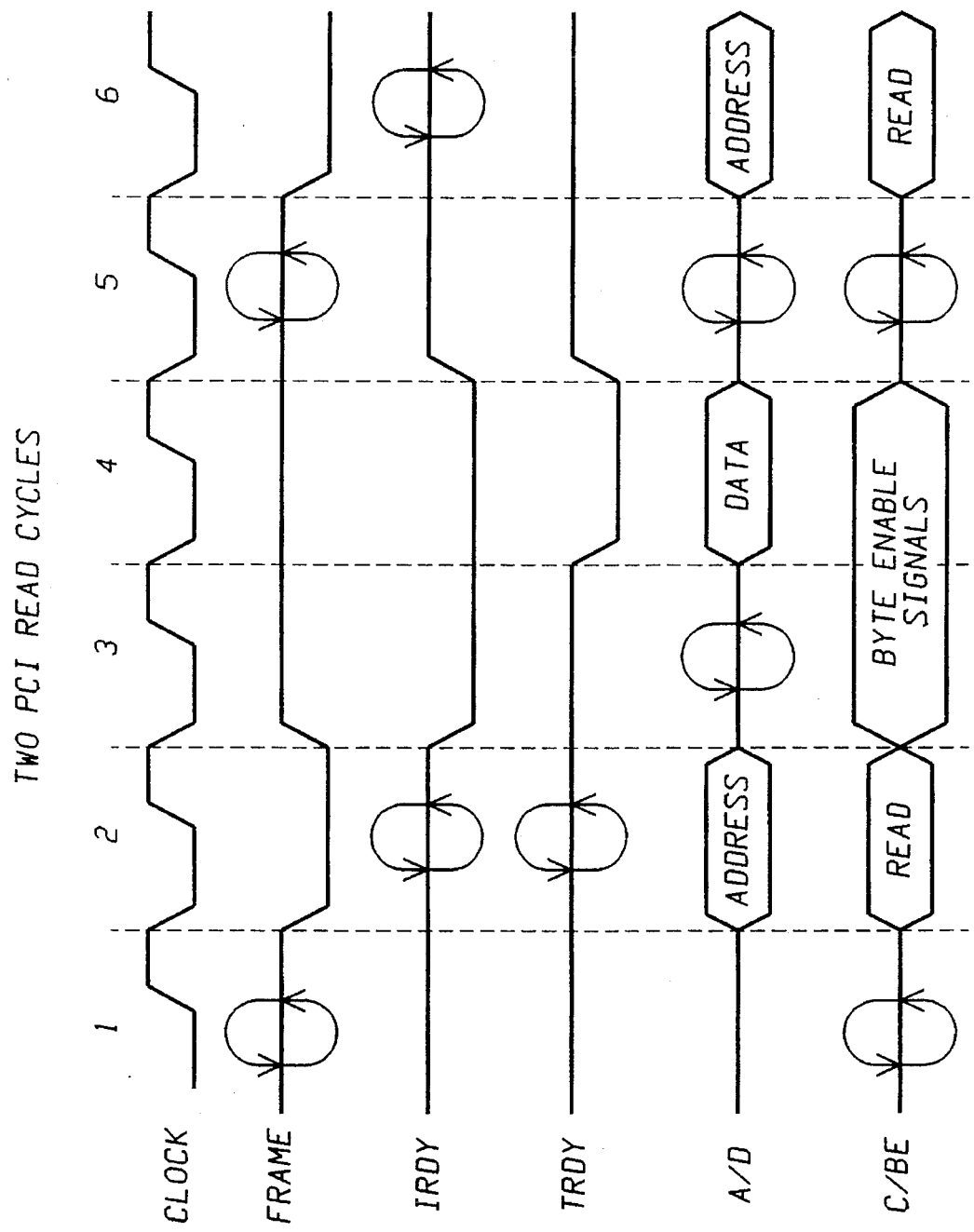
FIG. 3 is a timing diagram of the signals of FIG. 2 during a read operation.

Referring specifically now to FIG. 3, a timing diagram of a read cycle and the start of another read cycle is shown. During clock No. 2, the master asserts FRAME low. FRAME remains low for only one clock signal, clock No. 2, since this is a single data phase transfer. Address information is also supplied on AD by the master and a read command is given on the C/BE line during clock No. 2.

In the third clock sequence, the Ad line must go into a turnaround cycle because the slave has to take control of the AD line during the fourth clock signal to provide the data that the master has requested to read. This turnaround cycle is necessary to eliminate contention between the master and slave on the AD line. The master asserts IRDY low during clock No. 3 signalling it is prepared to read the requested data. During the third clock signal, the master also asserts the byte enable signals on the C/BE line.

During the fourth clock signal, the slave provides the data on the Ad line and asserts TRDY. The byte enables are still asserted on the C/BE line. Since the IRDY signal is low in the fourth clock, the data to be read is transferred from the slave to the master.

When a master connected to a PCI bus needs to transfer data to a component or device connected to a system or CPU local bus, a two-step procedure must be used. (System buses, for example S-bus 16, and CPU local buses both conform to X86-type bus architecture, and thus it will be hereinafter referred to as CPU local bus architecture. ) During the first step, the host bridge that connects the PCI bus to the CPU local bus is a slave for a data transfer on the PCI bus. For the second step, the host bridge becomes a master for a read or write cycle, whatever the case may be, on the CPU local bus and the device or component to which the data transfer is targeted is a slave for this particular data transaction.

For instance, if graphics controller 72 targets a write cycle for DMA controller 40, PCI host bridge 20 becomes a slave for a write cycle on primary PCI bus 22. The data to be written during the write cycle is then transferred to host bridge 20. Host bridge 20 then becomes the master for a write cycle on the S-bus 16 with DMA controller 40 as the slave or target of the write cycle. The data is then again transferred .from the host bridge 20 to the DMA controller 40 during the write cycle on the S-bus 16. Read cycles operate in the a similar two-step procedure wherein the host bus 20 is a slave on the PCI bus 22, and then becomes the master to complete the data transfer on the S-bus 16.

Furthermore, if a master on the S-bus 16 initiates a data transfer to a device on the PCI bus 22, it must first use the host bridge 20 as a slave. Then the host bridge 20 becomes the master for the data transfer on the PCI bus 22.

Data transfers between devices connected to PCI buses below PCI bridge 80 in the PCI network and components connected to the CPU local bus 34 or S-bus 16 must complete the data transfers up through the PCI network by performing consecutive data transfers to and from the PCI bridges connecting the network together. Once PCI bridge 80 has the data to be transferred, if the particular transfer is a write cycle, then the two-step procedure set forth above is used to complete the data transfer with PCI bridge 80 used as a master on the PCI bus 22 and host bridge 20 being a slave on the PCI bus 22 and a master on the S-bus 16.

Data transfers between S-bus 16 and the PCI bus 22 must be completed in two-steps because they have different bus architectures. In the CPU local bus architecture, data and address information are not multiplexed as in the PCI bus architecture; they are transmitted on separate lines. The strings of data and address information on these lines are 32 bits (4 bytes) in length.

The CPU local bus architecture does have a byte enable line, which performs the identical function of the byte enable signals in PCI bus architecture. Thus, the byte enable signals in the CPU local bus architecture are four bits in length and indicate whether a particular byte of the data on the data line is enabled or not enabled (disabled).

The CPU local bus 34 and S-bus 16 use the CLOCK signal from PCI bus 22 as a timing signal. Each duration of the clock signal on the CPU local bus 34 and S-bus 16 is called a bus cycle.

Unlike PCI bus architecture, the data and address information of CPU local bus 34 are transmitted on separate lines. Thus, once the slave to which a data transfer is targeted responds to the address transmitted on the address line, the data transfer can be completed in one bus cycle on the CPU local bus. During a burst transfer of several 32-bit strings of data to consecutive addresses, once the slave responds for the first transfer, each of the subsequent data transfers can be completed in a single bus cycle. During a data transfer, the byte enable line generates the byte enable signals on the CPU local bus.

Referring to FIG. 2, if the write cycle illustrated in clock Nos. 2 through 4 is ultimately targeted for a component connected to the S-bus 16, the host bridge 20 is the slave to which the PCI write cycle is directed. Accordingly, host bridge 20 receives the data transmitted in the third clock in one of its internal registers by responding to the address transmitted in the second clock.

Then, once it gains control of the S-bus 16, the host bridge 20, acting as a master, generates a write cycle on S-bus 16. During the first bus cycle, the host bridge 20 transfers the same address information, and byte enable signals it received during the PCI write cycle onto their respective lines on the S-bus 16. The appropriate slave responds to the address information and the data is transferred during the next bus cycle after the response.

Figure 4:
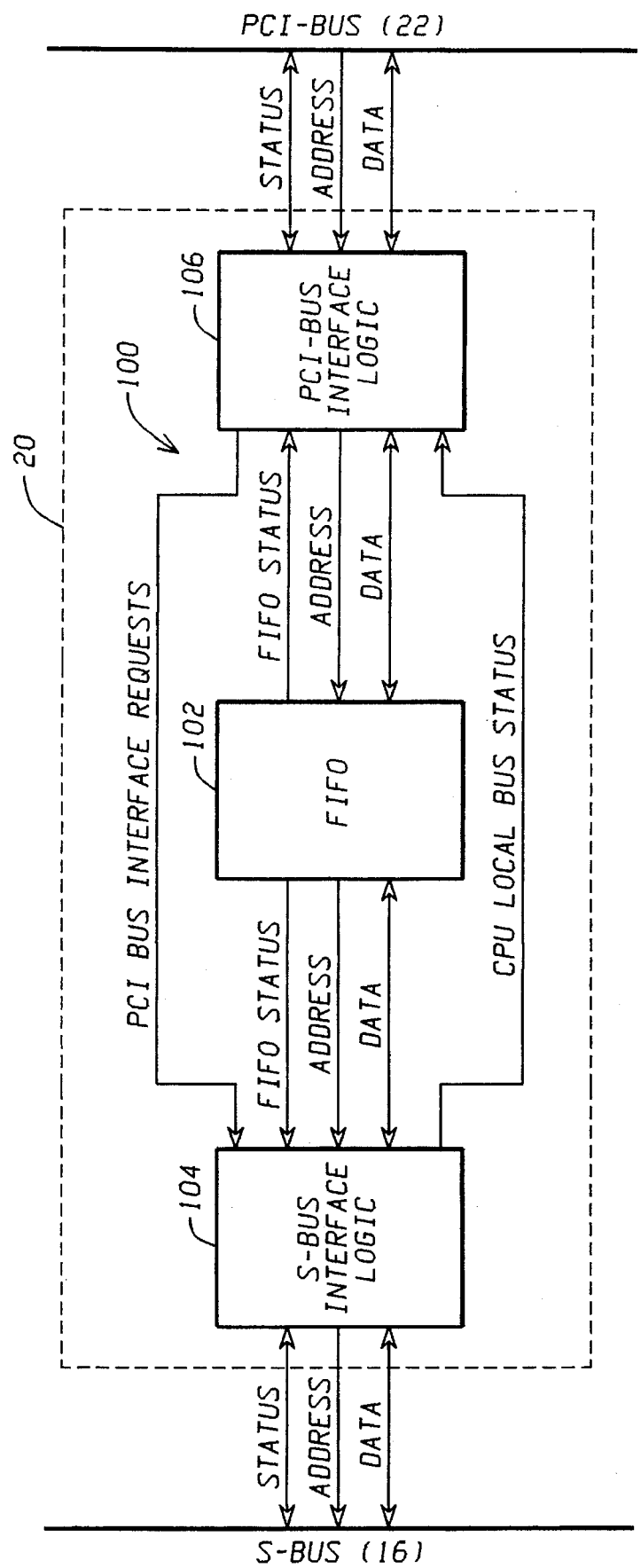
FIG. 4 is a block diagram of the interface hardware of the host bridge of the system of FIGS. 1A through 1C.

Referring now to FIGS. 4, a block diagram of the logic 100 which in part forms the PCI host bridge 20 and which provides the bus-to-bus interface mechanism between PCI Bus 22 and S-bus 16 is shown. Logic 100 comprises (i) first-in-first-out (FIFO) buffer logic 102; (ii) S-bus interface logic 104 for interfacing the S-bus 16 with the FIFO buffer logic 102; and (iii) PCI bus interface logic 106 for interfacing the primary PCI bus 22 with the FIFO buffer logic 102.

FIFO buffer logic 102 includes a first-in-first-out buffer (FIFO) (not shown) which is capable of storing a 16 byte (4 DWORD) data string. The FIFO is capable of read-prefetching data from S-bus 16 and write-posting data into it from PCI Bus 22. The FIFO read-prefetches data by anticipating that a read burst transfer will read data from consecutive addresses, and thus, "prefetches" the data from those addresses before the particular master initiating the transfer requests to read the data. Write-posting occurs when the FIFO accepts data from consecutive addresses during a write burst transfer from a PCI master, and thus, "posts" the data from the master before the host bridge transfers it to the slave connected to S-bus 16. The FIFO may be implemented, for example,. in a double word (DWORD) interleaved structure or a ping-pong structure. A complete description of the operations of FIFOs and read-prefetching and write-posting is provided in the co-pending patent applications assigned to I.B.M. Corporation set forth above.

The S-bus interface logic 104 responds to requests from the PCI bus interface logic 106 to read or read-prefetch data into the FIFO 102 from the S-bus 16. Interface logic 104 also writes data from the FIFO onto the S-bus 16 in response to status information provided by the FIFO or the PCI bus interface logic 106.

The PCI bus interface logic 106 responds to PCI bus cycles targeted for the S-bus 16. For read cycles, it requests S-bus logic 104 to read or read-prefetch data from the S-bus 16 and outputs requested data from the FIFO based on status information provided by the FIFO. For write cycles, PCI bus interface logic 106 allows data to be written or write-posted into the FIFO based on status signals from the FIFO.

When data is being input to the FIFO from a device connected to PCI bus 22, PCI interface logic 106 must monitor the status of the FIFO to ensure that new data is not written over other valid data strings already in the FIFO. If all 4 DWORDS of the FIFO are already full with data, then more data cannot be input to it.

During either a posted-write or read-prefetch burst transfer initiated from PCI bus 22, when the data being posted or fetched, respectively, fills up the FIFO, the burst transfer must be terminated or valid data will be written over in the FIFO. One method that may be used to terminate the burst transfer is to simply force the device providing the data to the FIFO, or reading data from the FIFO, to relinquish its access to PCI bus 22. This effectively disconnects the device from host bridge 20 terminating the data transfer.

Once a device gives up its access to PCI bus 22, however, due to PCI bus architecture arbitration guidelines, it may not regain access to the PCI bus 22 for a minimum period of five clocks on the PCI bus 22. Moreover, the device may not regain control of the PCI bus 22 for an indefinite period of time. Accordingly, if the burst transfer from the device connected to PCI bus 22 and targeted for S-bus 16 was several .data phases in length, the device would be forced to disconnect from the host bridge 20 several times before the transfer could be completed. The time period required to complete the transfer would be indefinite, and undoubtedly long.

Another method that may be used to ensure that data is not over-written in the FIFO, which heretofore has been unknown, is to deassert the TRDY signal on the PCI bus 22 when the FIFO is full, while allowing the device connected to the PCI bus 22 initiating the data transfer (the "PCI master") to maintain its access to the PCI bus 22. When storage space in the FIFO becomes available, TRDY is reasserted and the burst transfer can be completed. This method eliminates the problem of terminating the initiating device's access to PCI bus 22. Accordingly, burst transfers from the PCI bus 22 to S-bus 16 can be accomplished far more efficiently than the disconnection method discussed above. Furthermore, time required to complete the data transfer is optimized because data is transferred into the FIFO immediately when space becomes available in the FIFO. This method is provided by the inventive pacing logic described below.

Figure 5A:
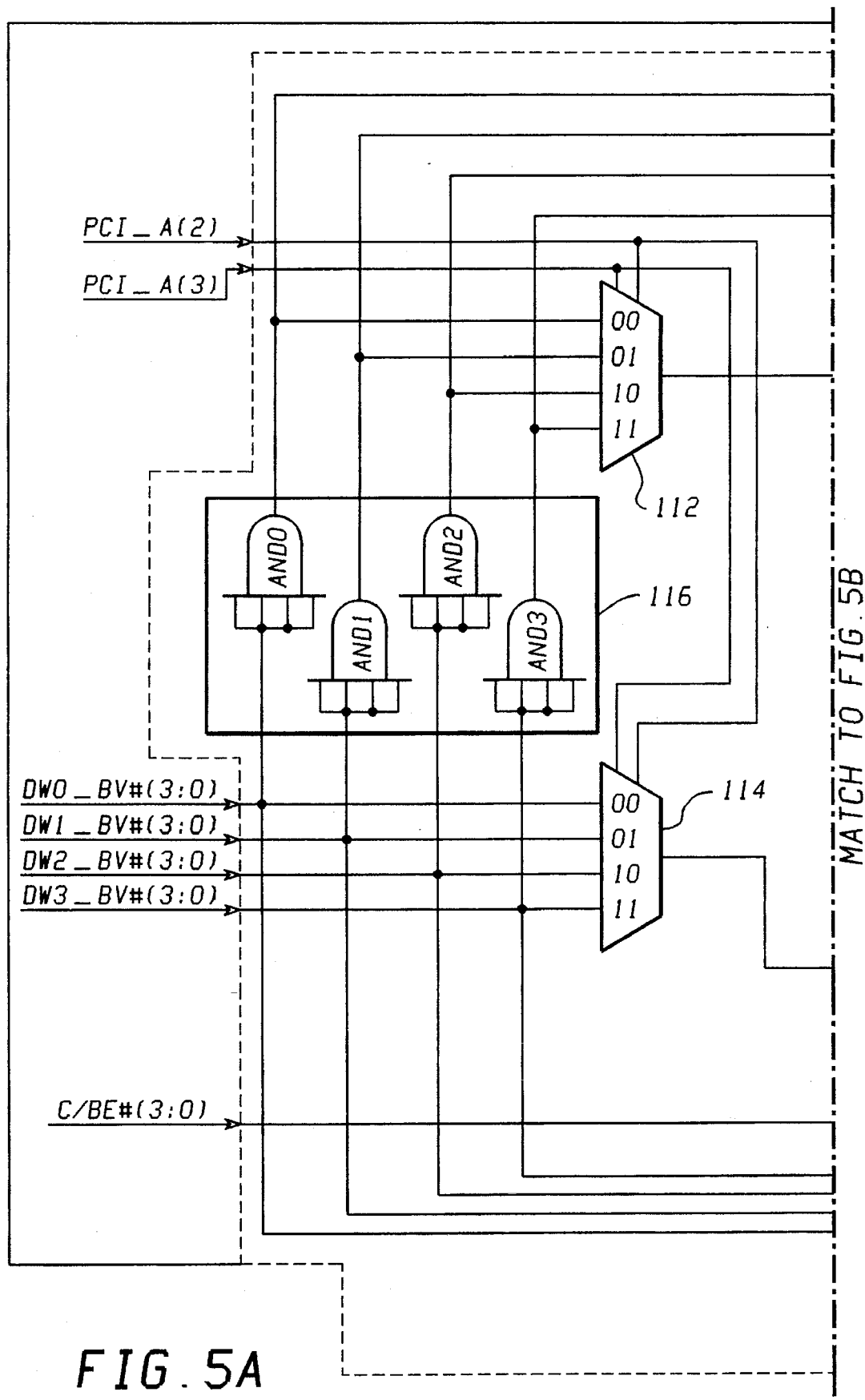
FIGS. 5A and 5B, taken together, are a logic diagram of the pacing logic of the interface hardware of FIG. 4.
Figure 5B:
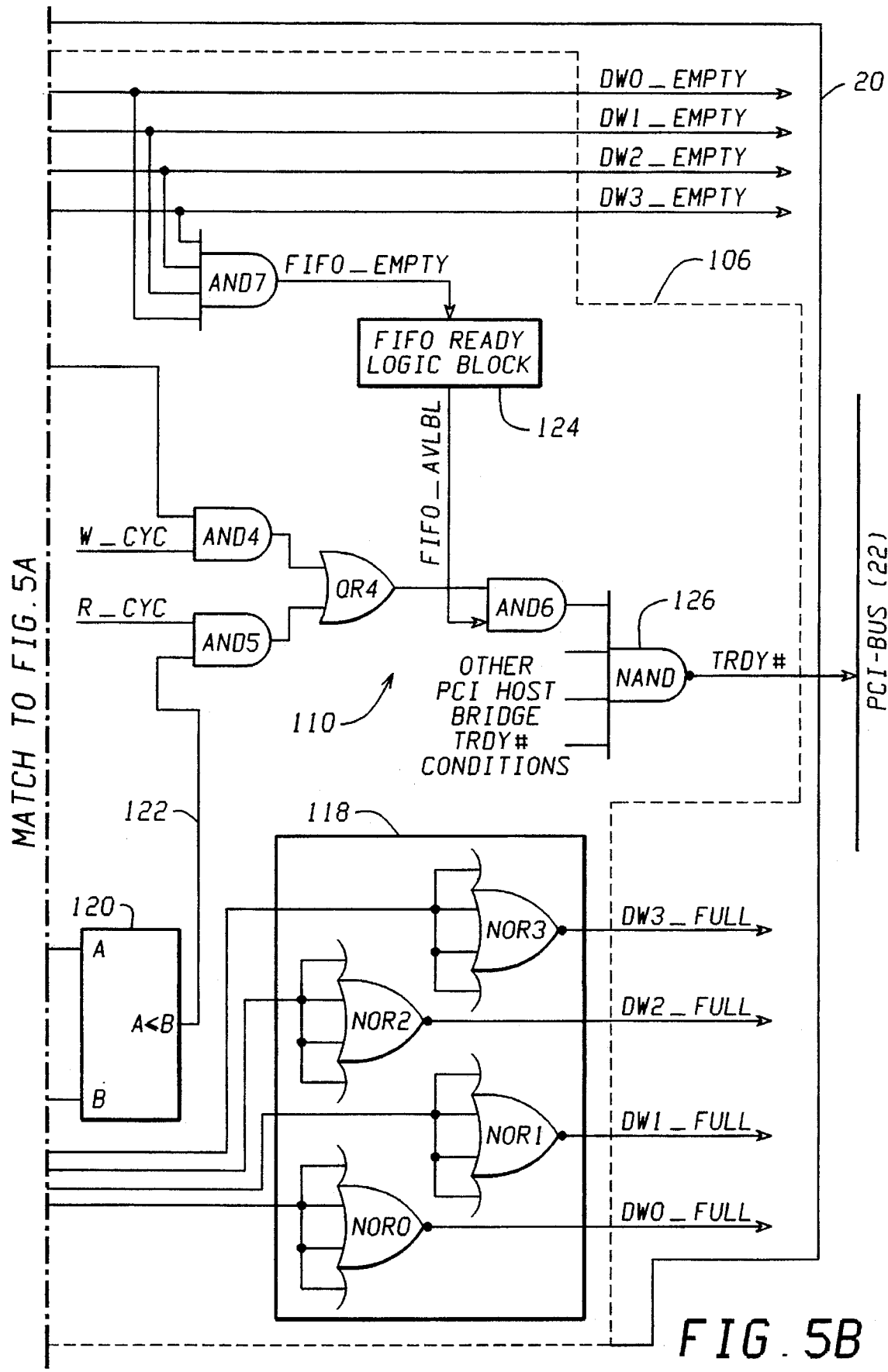

Referring now to FIGS. 5A and 5B, a diagram of pacing logic 110 is shown. Pacing logic 110 is hardware logic within PCI host bridge 20 that comprises a portion of the PCI bus interface logic 106. The primary purpose of pacing logic 106 is to deassert and assert the TRDY signal on PCI bus 22 so that the pace of data input to the FIFO from PCI bus 22 can be controlled in an optimum fashion.

The FIFO, as stated above, is capable of temporarily storing 16 bytes or 4 DWORDs of data. (A DWORD of storage space within the FIFO shall be referred to generally herein as a "DWORD of the FIFO"). Each DWORD within the FIFO is assigned one of the four binary values of bit numbers 2 and 3 of the 32-bit PCI address signal. Bit numbers 2 and 3 are the least significant address bits of a PCI address which are necessary to select a DWORD in the FIFO (bit numbers 0 and 1 are not used by the PCI architecture for PCI memory addresses. The binary values of bit numbers 2 and 3 assigned to the four consecutive DWORDs of the FIFO are 00, 01, 10 and 11, or; decimal 0, 1, 2 and 3, respectively. The value of bit numbers 2 and 3 for the present PCI data phase are input to pacing logic 110 on the lines labeled PCI_A [2] and [3].

The PCI_A lines are input to two 4-input multiplexors, 112 and 114. Each of the inputs of multiplexors 112 and 114 correspond to one of the four possible values of the signals on the PCI_A lines, and thus, also corresponds to one of the four DWORDs of the FIFO. Multiplexors 112 and 114 select the input that corresponds to the present value on the PCI_A lines and outputs the present signal from that input.

The inputs to multiplexor 114 are the four PCI byte enable signals that correspond to the four DWORDs of data in the FIFO. If there is no data within a particular DWORD, then the byte enable signal for that DWORD will be 1111 which indicates that none of the bytes in the DWORD contain enabled data. The byte enable signals for the four DWORDs of the FIFO are stored in latch registers within the hardware of host bridge 20 (not shown) and are called the latched byte valid signals. The lines transmitting the latched byte valid signals to the inputs of multiplexor 114 are labeled DW0_BV, DW1_BV, DW2_BV and DW3_BV and correspond to DWORD 0, DWORD 1, DWORD 2 and DWORD 3 of the FIFO, respectively.

Each of the latched byte valid signals is input to a corresponding AND gate in a bank of four, 4-input AND gates 116 and a corresponding NOR gate in a bank of four, 4-input NOR gates 118. For example, the DW0_BV signal is input to AND0 of bank 116 and NOR0 of bank 118. The AND gates and NOR gates of banks 116 and 118, respectively, perform logic operations on each 4-bit latched byte valid signal.

The outputs from each of the four AND gates of bank 116 are input to one of the corresponding four inputs of multiplexor 112 and indicate whether the DWORD of the FIFO that it corresponds to is empty or not. For example, the output of AND0 is connected to the input of multiplexor 112 that corresponds to DWORD 0 of the FIFO.

The outputs of each of the four NOR gates of bank 118 indicate whether the DWORD of the FIFO that it corresponds to is full of enabled data or not. For example, when the output of NOR0 is a binary high, it indicates that DWORD 0 of the FIFO is full. These signals are output to the remaining hardware that comprises host bridge 20.

The output of multiplexor 112 is connected to one input of a 2-input AND gate (AND4). The other input of AND4 is connected to a signal, W_CYC, which is always a binary high, or 1, if the present data transfer from PCI bus 22 is a write operation and is always low during a read data transfer.

The output of multiplexor 114 is connected to one input of a 2-input comparator 120. The byte enable signals from the C/BE line of PCI bus 22 are connected to the other input of comparator 120. Comparator 120 compares the output of multiplexor 114, which is the latched byte valid signal of a particular DWORD of the FIFO, to the byte enable signals of the present read transfer. These byte enable signals are generated by the PCI master that generated the read transfer. If the signal from the multiplexor 114 is less than or equal to the byte enable signals, then comparator 120 generates a binary high signal on an output line 122.

Output line 122 is connected to one input of a 2-input AND gate (AND5). The other input of AND5 is connected to a signal labeled R_CYC. R_CYC is always a binary high during a read data transfer and is always low during a write data transfer.

The outputs of AND4 and AND5 are each connected to one input of a 2-input OR gate (OR4). The output of OR4 is connected to one input of a 2-input AND gate (AND6). The other input of AND6 receives a signal from a FIFO ready logic block 124, FIFO_AVLBL. FIFO ready logic block 124 generates a high signal for FIFO_AVLBL when the FIFO is available for the current data transfer initiated by the PCI master.

The output of AND6 is connected to a multiple input NAND gate 126. The other inputs to NAND gate 126 are connected to other signals within host bridge 20 that may impact the assertion or deassertion of the TRDY signal on PCI bus 22. These signals may be a PCI host bridge 20 target abort, or a PCI host bridge 20 target disconnect meaning that the host bridge 20 does not want another data transfer to occur.

The output of NAND gate 126 is the TRDY signal which is connected to the TRDY line of PCI bus 22. When all of the inputs to NAND gate are a binary high, including the output of AND6, then the output of NAND 126 will become low. Thus, TRDY will be activated low, which signals to the device on PCI bus 22 initiating the data transfer that the data can be written into or read from the FIFO during the present PCI data phase.

The outputs of the four AND gates in bank 116 are also all input to a 4-input AND gate (AND7) and output to the rest of the hardware that comprises host bridge 20. As stated above, each of these four signals, when high, indicate to the hardware of bridge 20 that a particular DWORD of the FIFO is entirely empty. The Output of AND7 is labeled FIFO_EMPTY. The output of AND7 is input to FIFO ready logic block 124.

Figure 6:
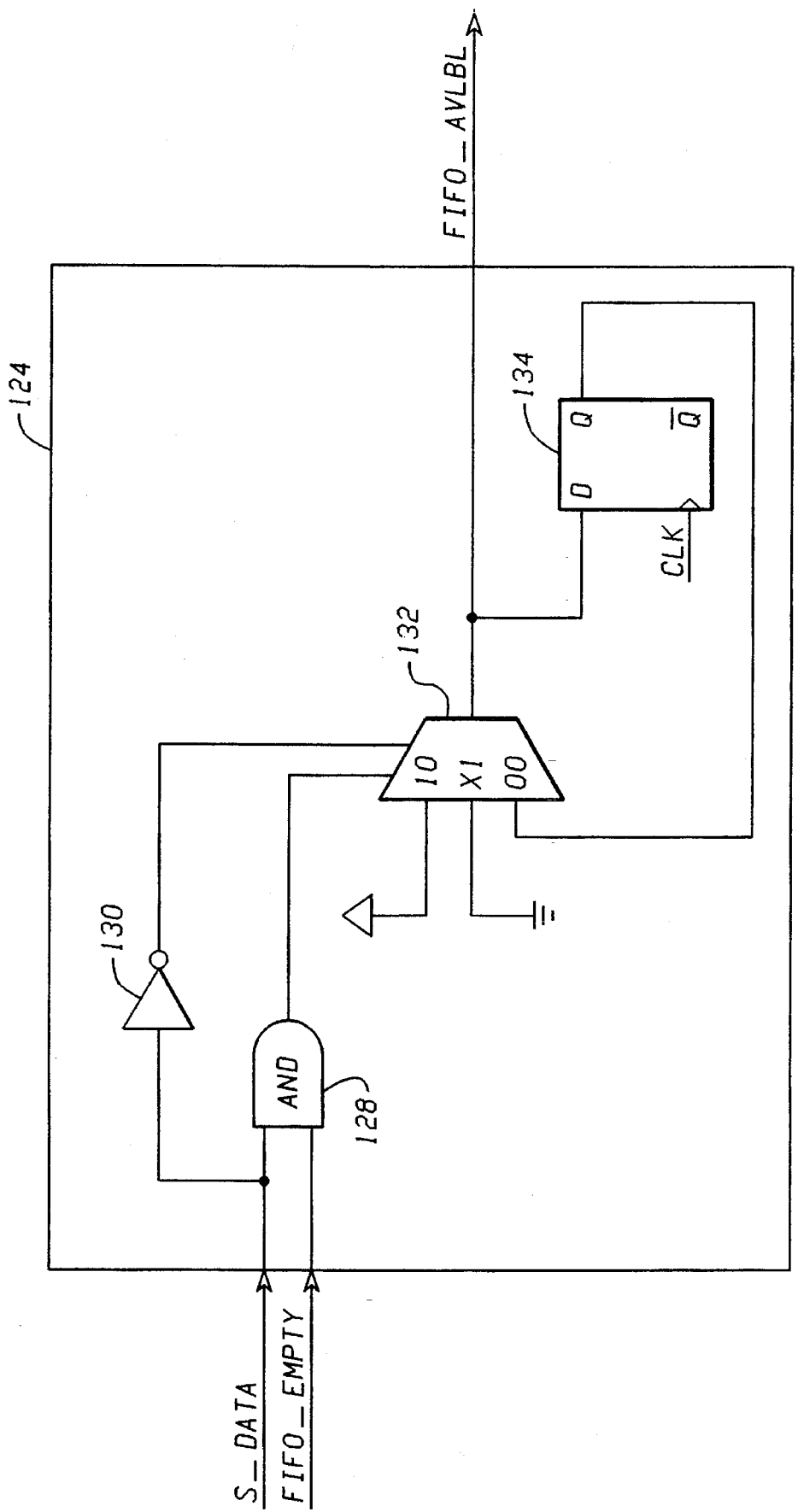
FIG. 6 is a logic diagram of the FIFO ready logic block of the pacing logic of FIGS. 5A and 5B.

Referring now to FIG. 6, a diagram of FIFO ready logic block 124 is shown. The FIFO_EMPTY signal from AND6 is connected to one input of a 2-input AND gate 128. The other input to AND gate 128 is a signal S_DATA. S_DATA is generated by known hardware within host bridge 20. When S_DATA is a binary high, it indicates that a data transfer initiated by a master connected to PCI bus 22 is directed to a device or component connected to S-bus 16, and the host bridge 20 is in a state in which it can conduct the data transfer.

An inverter 130 is connected to S_DATA in parallel with AND gate 128. The outputs of AND gate 128 and inverter 130 are connected as control signals to a 3-input multiplexor 132. The multiplexor 132 selects one of its three inputs to transmit on its output depending upon the values of the control signals from AND gate 128 and inverter 130. When the output from AND gate 128 is high and the output from inverter 130 is low, then multiplexor 132 outputs its first input which is connected to a binary high value. Any time that S_DATA is low regardless of the output from AND gate 128, multiplexor 132 outputs its second input which is connected to a binary low value. When the outputs from both inverter 130 and gate 128 are both low, then multiplexor 132 outputs its third input which is connected to the output of a latch 134.

The input of latch 134 is connected to the output of multiplexor 132. Thus, the signal from the output of multiplexor 132 is fed back through latch 134 to the third input of multiplexor 132. The output of multiplexor 132 is also the FIFO_AVLBL signal that is connected to one input of AND6 of pacing logic 110.

Pacing logic 110 operates differently depending upon whether the burst transfer initiated by the PCI master is a write or a read operation. In operation during a write burst transfer, the PCI master initiates a write burst transfer targeted for S-bus 16 by driving an address within a certain range on the AD line of PCI bus 22. Host bridge 20 responds to this address by driving S_DATA to a high signal. At this point, assuming that the FIFO is empty, the values of all the latched byte valid signals are logical 1's. Thus, the outputs of each of the AND gates in bank 116 will be high which drives the output of AND7, FIFO_EMPTY, to a high.

With both S_DATA and FIFO_EMPTY high, the outputs of inverter 130 and gate 128 are low and high, respectively. This causes a high signal to be driven on the output of multiplexor 132 as FIFO_AVLBL. This high signal is also latched into latch 134 for the duration of one PCI clock signal.

For purposes of this example it is assumed that the bit numbers two and three of the first address of the burst transfer have the binary value "00", however they could have any of the other three possible values discussed above. This will cause multiplexor 112 to select the output from AND0 to be transmitted on its output, which will be a binary high value, since, as stated above, DW0_BV, will have the value of all binary 1's.

The high output from multiplexor 112 is input to AND4 along with the high value of W_CYC. Thus, AND4 generates a high output causing OR4 to generate a high output. Because FIFO_AVLBL is high and the output from OR4 is high, the output of AND6 becomes high.

If the other TRDY conditions input to NAND 126 are high when the output from AND6 becomes high, NAND gate 126 activates TRDY low. This causes data to be written from the master into DWORD0 of the FIFO.

Since this is a sequential burst transfer, and data is being write-posted into the FIFO, bit numbers 2 and 3 of the address for the second data cycle are incremented by other hardware within host bridge 20 discussed below to "01" and DWORD1 of the FIFO is used to receive the data during that cycle. Accordingly, multiplexor 112 selects the output of AND1 to be transmitted as its own output. Because DWORD1 is empty, DW1_BV is comprised of all 1's. Thus, the outputs of AND1 and multiplexor 112 are both high values. This causes both AND4 and OR4 to generate high values on their outputs.

AND0 for the second data cycle will now have a low output because DW0_BV will consist of a four place binary value having at least one 0 indicating the presence of data within DWORD0 of the FIFO. Thus, the FIFO_EMPTY signal from AND7 is becomes a low value because the FIFO is no longer completely empty.

FIFO_EMPTY is input to AND gate 128 along with S_DATA, which remains a high value throughout the entire burst transfer. Because FIFO_EMPTY is now low, however, AND gate 128 generates a low value on its output. Thus, the binary control values input from AND gate 128 and inverter 130 to multiplexor 132 are both low. This causes multiplexor 132 to select the feedback input from latch 134 to be generated on its output as FIFO_AVLBL, which is a binary high.

Since both FIFO_AVLBL and the output from OR4 are both high, the output of AND6 is high. This causes NAND 126 to activate TRDY low and data is written from the master into DWORD1 of the FIFO during the second data phase.

The process repeats itself by incrementing bit numbers 2 and 3 of the address until each DWORD of the FIFO contains data. If the slave attached to the S-bus 16 (the "slave" or "S-bus slave") becomes available to complete the transfer, data will be transferred out of the FIFO starting with DWORD0. If the DWORDS of the FIFO are emptied before the PCI master attempts to write-post new data into them, then TRDY will remain a low value allowing the new data to be input into the FIFO. Accordingly, data will be continuously input into the FIFO until the master attempts to write-post data into a DWORD that already contains valid data.

This condition will probably occur many times within a multiple data phase burst transfer because the S-bus 16 can only burst 16 bytes of data at once and then must pause. Thus, the slave connected to S-bus 16 may empty the FIFO slower than the master on the PCI bus can fill it with data.

When the master attempts to write-post data into a DWORD that already contains valid data, for example DWORD0, the output from bank 116, specifically AND0, will be a low. Multiplexor 112 selects this low input to be driven on its output which ultimately causes a low value to be input to NAND gate 126. This deasserts TRDY to a high preventing the master from completing the data transfer during the present PCI clock signal.

TRDY is continuously deasserted during the succeeding PCI clocks until the data within DWORD0 is output to the slave connected to S-bus 16. When this occurs the value of DW0_BV becomes all logical 1's again. Accordingly, AND1 generates a high signal through multiplexor 112, AND4, OR4 and AND6 to NAND 126 thereby causing NAND6 to activate TRDY low, which allows the data to be written into DWORD0. Thus, pacing logic 110 optimizes the write-posting of data from PCI bus 22 into the FIFO by activating TRDY immediately when a DWORD becomes available in the FIFO.

These assertions and necessary deassertions of TRDY continue throughout the burst transfer until the PCI master signals the burst transfer is complete by deasserting FRAME. When this occurs, S_DATA is driven low by hardware within PCI bridge 20. When S_DATA becomes low, multiplexor 132 drives FIFO_AVLBL low causing the output of AND6 to become low and TRDY to be deasserted high.

During a read burst transfer initiated by a master connected to PCI bus 22 and targeted to a slave attached to S-bus 16, host bridge 20 read-prefetches data from the slave into the FIFO. TRDY is asserted when the data that the PCI master is attempting to read from a particular address is present in the DWORD of the FIFO that corresponds to bit numbers 2 and 3 of the address. Pacing logic 110 also provides this function of asserting TRDY for read burst transfers initiated from the PCI bus 22.

The FIFO ready logic block 124 functions the same way for read transfers as it does for write transfers. Thus, when a read transfer is initiated by the PCI master for the S-bus 16 and the FIFO is empty, S_DATA becomes high which causes FIFO_AVLBL to be high throughout the data transfer.

Depending upon bit numbers 2 and 3 of the address to which the present PCI data phase is directed, multiplexor 114 will output a latched byte valid signal for the particular DWORD of the FIFO that corresponds to those bit numbers. For example, if the initial data transfer of a read burst transfer is directed to an address that has bit numbers 2 and 3 equal to "00". Then multiplexor 114 will select DW0_BV to be driven on its output.

The output of multiplexor 114 is input to comparator 120 in which it is compared with the byte enable signals of the present PCI data cycle. If the comparator determines that the output from multiplexor 114 is less than or equal to the byte enable signals, then it outputs a high signal which is input to AND5. When this condition occurs, the data that the master seeks to read from the slave is present in DWORD0 of the FIFO, and thus, TRDY should be asserted.

Accordingly, the high signal from comparator 120 is passed through AND5, OR4, and AND6 to NAND 126 which asserts TRDY and the data is read from DWORD0 by the PCI master.

If DW0_BV is greater than the byte enable signals then the requisite data is not present in DWORD0. Thus, the output from comparator 120 is low and TRDY is not asserted. However, once the data sought by the master is input to DWORD0 from S-bus 16, the output of comparator 120 becomes high allowing TRDY to be asserted low.

This process is repeated by incrementing the bit numbers 2 and 3 of the address values as discussed above until the burst transfer is complete. When this occurs, bridge 20 drives S_DATA to a low which causes TRDY to be deasserted high.

Figure 7:
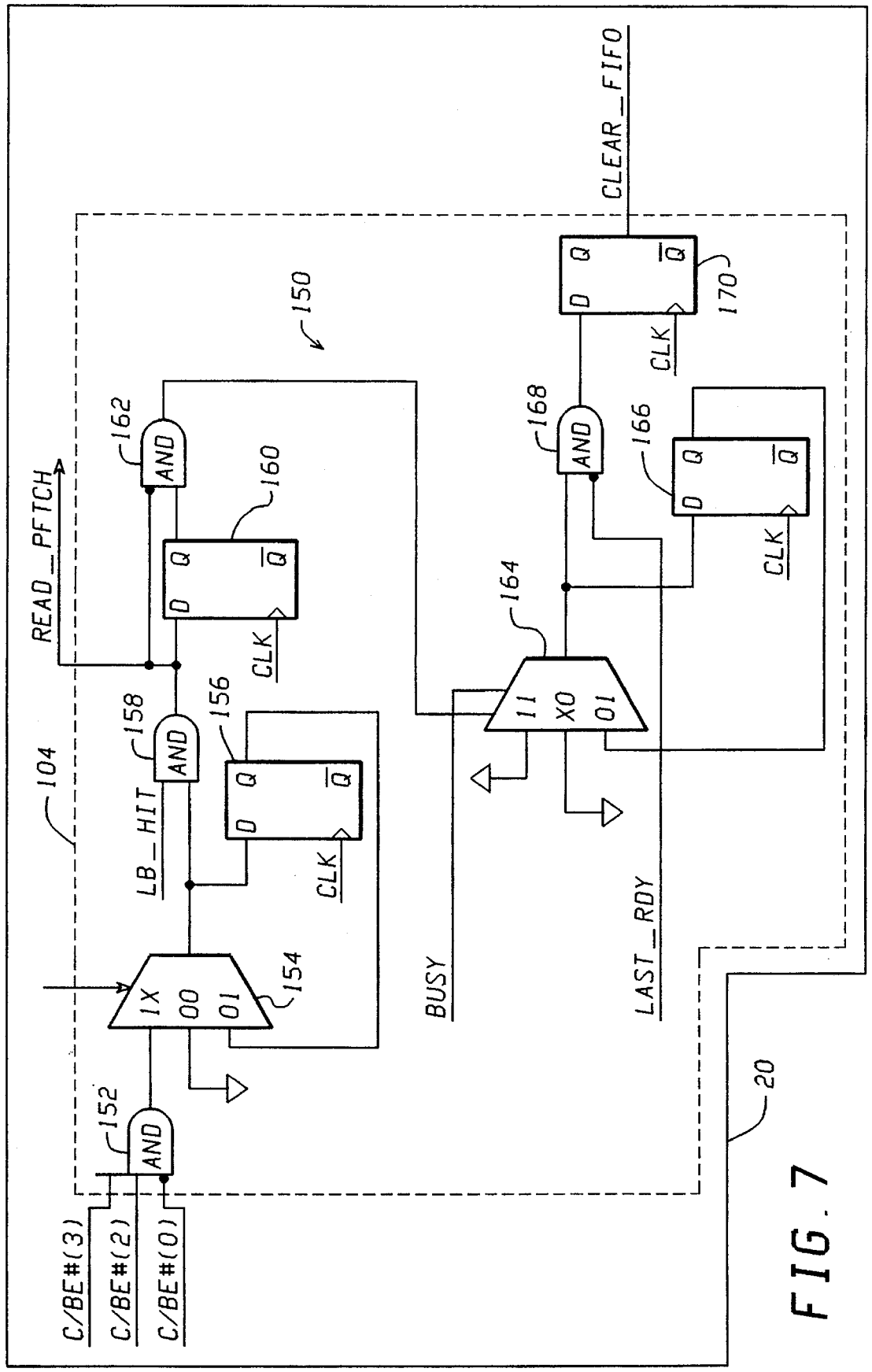
FIG. 7 is a logic diagram of the read prefetch logic of the interface hardware of FIG. 4.

Referring now to FIG. 7, a diagram of read-prefetch logic 150 of S-bus 16 interface logic 104 is shown. Read-prefetch logic 150 anticipates when data should be read-prefetched into the FIFO from a slave connected to S-bus 16 based upon the bus commands from the PCI master. Accordingly, read-prefetch logic 150 immediately "fetches" data only when a burst read transfer is initiated by a PCI master, optimizing the use of the FIFO and the time required to complete a read burst transfer.

Read prefetch logic 150 includes a 3-input AND gate 152 having its three inputs connected to bit numbers 3, 2 and 0 of the C/BE line of PCI bus 22. The value of bit number 0 is inverted before it is input to AND gate 152. Thus, a high binary value on both bit numbers 2 and 3 of the C/BE line of PCI bus 22 and a low binary value on bit number 0 will cause the output of AND gate 152 to be high.

This binary combination of these three bits during a command cycle indicate that the master initiating the read data transfer is initiating a burst read data transfer, and thus, data should be read-prefetched into the FIFO to optimize the speed of the overall data transfer. The specific PCI bus commands indicated by this bit value combination are "Memory Read Long" and "Memory Read Multiple".

The output of AND gate 152 is connected to the first input of a 3-input multiplexor 154. The second input of multiplexor 154 is connected to a binary low value. The third input of multiplexor 154 is connected and fed back through a latch 156 to its own output.

Multiplexor 154 selects one of its inputs to be driven on its output based upon the status of various PCI bus signals it receives as control signals through the hardware of host bridge 20. During a PCI command and address phase, multiplexor 154 selects its first input (the output from AND gate 152) to be driven on its output. During data phases on the PCI bus 22, multiplexor 154 selects its third input to be driven on its output. When the read burst transfer initiated by the PCI master is complete meaning that all the requested data has been read by the master, then multiplexor 154 selects its second input, a binary low value to be driven on its output.

The output of multiplexor 154 is not only connected to latch 156, but it is also connected to one input of an AND gate 158. The other input to AND gate 158 is connected to a signal, LB_HIT, which is generated by the hardware of bridge 20. LB_HIT becomes high when the host bridge 20 decodes the address for the data transfer generated by the PCI master and determines that it is targeted for a slave connected to S-bus 16.

The output of AND gate 158 is a signal, READ_PFTCH, that is connected to the other hardware of the host bridge 20. When READ_PFTCH is a binary high, it indicates to the other hardware of host bridge 20 that data should be prefetched into the FIFO to be read by a master connected to PCI bus 22.

The output from AND gate 158 is also input to a latch 160 and inverted and input to an AND gate 162. The output of latch 160 is connected to the other input of AND gate 162.

Latches 156 and 160 hold the values input to them for the duration of 1 PCI clock signal and then output them during the next succeeding clock signals. Thus, when the output of AND gate 158 is high for the duration of several clocks and then becomes low during a clock signal and remains low for a period of clock signals, latch 160 will hold a high signal for a duration of one clock simultaneously when the output of AND gate 158 is low. Accordingly, for the duration of one clock signal, the output of AND gate 162 will "pulse" high and then become low again.

The output of AND gate 162 is connected as a control signal to a 3-input multiplexor 164. Multiplexor 164 has another control input signal, BUSY, which is generated by S-bus 16 interface logic 104. When BUSY is high it indicates that the data is still being prefetched over S-bus 16 in response to the read burst transfer initiated by the PCI master.

When BUSY is high and the output of AND gate 162 pulses high, multiplexor 164 outputs its first input which is connected to a binary high signal. When only BUSY is high, multiplexor 164 selects its third input, which is connected to the output of multiplexor 164 through a latch 166 as a feedback signal, to be driven on its output. When BUSY is low, then multiplexor 164 outputs its-second input, which is connected to a binary low.

The output of multiplexor 164 is connected to one input of an AND gate 168. The other input of AND gate 168 is the inverted binary value of a signal generated by S-bus 16 interface logic 104, LAST_RDY. LAST_RDY is always a binary high value until the last data string is prefetched into the FIFO from the slave connected to S-bus 16. The last data string that is prefetched from the slave is determined by interface logic 104 when the READ_PFTCH signal becomes low.

The output of AND gate 168 is connected to a latch 170. The output of latch 170 is a signal CLEAR_FIFO. When CLEAR_FIFO is high, it signals to FIFO logic 102 to clear the DWORDS of the FIFO and set the byte valid signals to all binary 13 s. Accordingly, the FIFO is emptied and ready for the next data transfer.

In operation, a PCI master initiates a read burst transfer during a PCI command/address phase by asserting a Memory Read Long or Memory Read Multiple command on the C/BE line of the PCI bus 22. During the same command/ address phase, the master transmits a memory address on the AD line of PCI bus 22 that indicates the read transfer is directed to a slave connected to S-bus 16.

Immediately, bit numbers 0, 2 and 3 of the C/BE line of PCI bus 22 are input to AND gate 152. These bit numbers have the binary values 0, 1 and 1, respectively, indicating the Memory Read Long or Memory Read Multiple PCI bus command. These commands indicate that the present read data transfer is a burst transfer. The low value of bit number 0 of the C/BE line is inverted before it is input to AND gate 152. Thus, the resulting output of AND gate 152 is a binary high value which is input to the first input of multiplexor 154.

Since the present PCI phase is an address phase, multiplexor 154 selects the high signal from AND gate 152 on its first input to be driven on its output. During the successive PCI data phases after the address phase, multiplexor 154 selects its third, feedback input to be driven on its output, which, because of latch 156 will always be a high value.

When host bridge 20 decodes the address asserted by the PCI master, it determines that the data transfer is targeted to a slave connected to S-bus 16. Accordingly, the hardware of host bridge 20 drives LB_HIT to a high signal.

The high values from multiplexor 154 and LB_HIT are input to AND gate 158 which cause it to generate a high output for the signal READ_PFTCH. When READ_ PFTCH becomes high, it signals to the FIFO buffer logic 102 and S-bus 16 interface logic 104 to begin prefetching data from the slave into the FIFO.

READ_PFTCH will remain high until the PCI master indicates that it has read all the data it requires from the slave (via the FIFO) by asserting the FRAME signal to a high value. When this occurs multiplexor 154 will select its second input, which is a binary low value to be driven on its output. Thus, AND gate 158 will generate a low signal for READ_PFTCH, which signals S-bus 16 interface logic 104 to stop prefetching data into the FIFO.

When the PCI master stops the data transfer by asserting FRAME high, data already may have been prefetched into the FIFO that is not needed and will not be read by the master. Any residual data must be cleared or emptied from the FIFO before another data transfer between S-bus 16 and PCI bus 22 can begin. The remaining logic of read prefetch logic 150 performs this function.

During the clock signal that AND gate 158 initially generates a low value for READ_PFTCH, the low value is inverted and input to AND gate 162. Simultaneously during this clock signal, latch 160 will output a high binary value that it was holding from the previous clock signal. Accordingly, for the duration of one clock signal when READ_ PFTCH becomes low, AND gate 162 pulses a high output.

This pulsed high output from AND gate 162 is input, along with the BUSY signal, to multiplexor 164 as a control signal. BUSY will also be high during this clock signal because S-bus 16 will be in the process of completing the last prefetches of data from the slave. Accordingly, multiplexor 164 will drive the high signal connected to its first input on its output.

As long as the S-bus 16 is busy completing the read prefetches initiated by read prefetch logic 150 as a result of the present data transfer, BUSY will remain high. This causes multiplexor 164 to select its feedback input, which because of latch 166, is a high signal.

This high signal is input to AND gate 168 along with LAST_RDY. When LAST_RDY becomes low signalling that the last read prefetch into the FIFO is complete, AND 168 will output a high signal to latch 170. Latch signal 170 holds this high signal on its output as the CLEAR_FIFO signal. CLEAR_FIFO causes the FIFO buffer logic to empty the FIFO of the unused, prefetched data and return all the latched byte valid signals to all binary 1's.

Thus, read prefetch logic 150 initiates read prefetching on the S-bus 16, intelligently, or only when a read burst transfer is initiated by a master connected to the PCI bus 22. Read prefetch logic 150 also clears the FIFO in an optimum fashion so that data transfers can be completed through the FIFO as quickly as possible.

In addition to read-prefetching logic 150, to fully optimize and translate communications between S-bus 16 and PCI bus 22, host bridge 20, and specifically S-bus 16 interface logic 104, must include hardware to accommodate two differences between the respective bus architectures related to burst transfers. One of these differences, which is discussed above, is that the PCI bus architecture can sequentially burst transfer data starting from any address while the CPU local bus/system bus architecture can only begin a sequential burst transfer on certain addresses.

The other difference between the CPU local bus and PCI bus architectures pertaining to burst transfers is that a CPU local bus or system bus cannot burst transfer data that is non-contiguous while a PCI bus has this capability. Non-contiguous data occurs when two or more bytes of data that are enabled by their respective byte enable signals are separated by a byte or bytes of data that are not enabled. Non-contiguous data during a burst transfer occurs when any or all of the byte enable signals for any of the data strings being transferred indicate that data is not enabled. For example, a burst transfer of four data strings would be non-contiguous if any of the byte enable signals of any of the four data strings had a binary high value (a value of 1). As stated above, non-contiguous data within a burst transfer is not possible within the bus architecture of CPU local bus 34 and S-bus 16.

Figure 8:
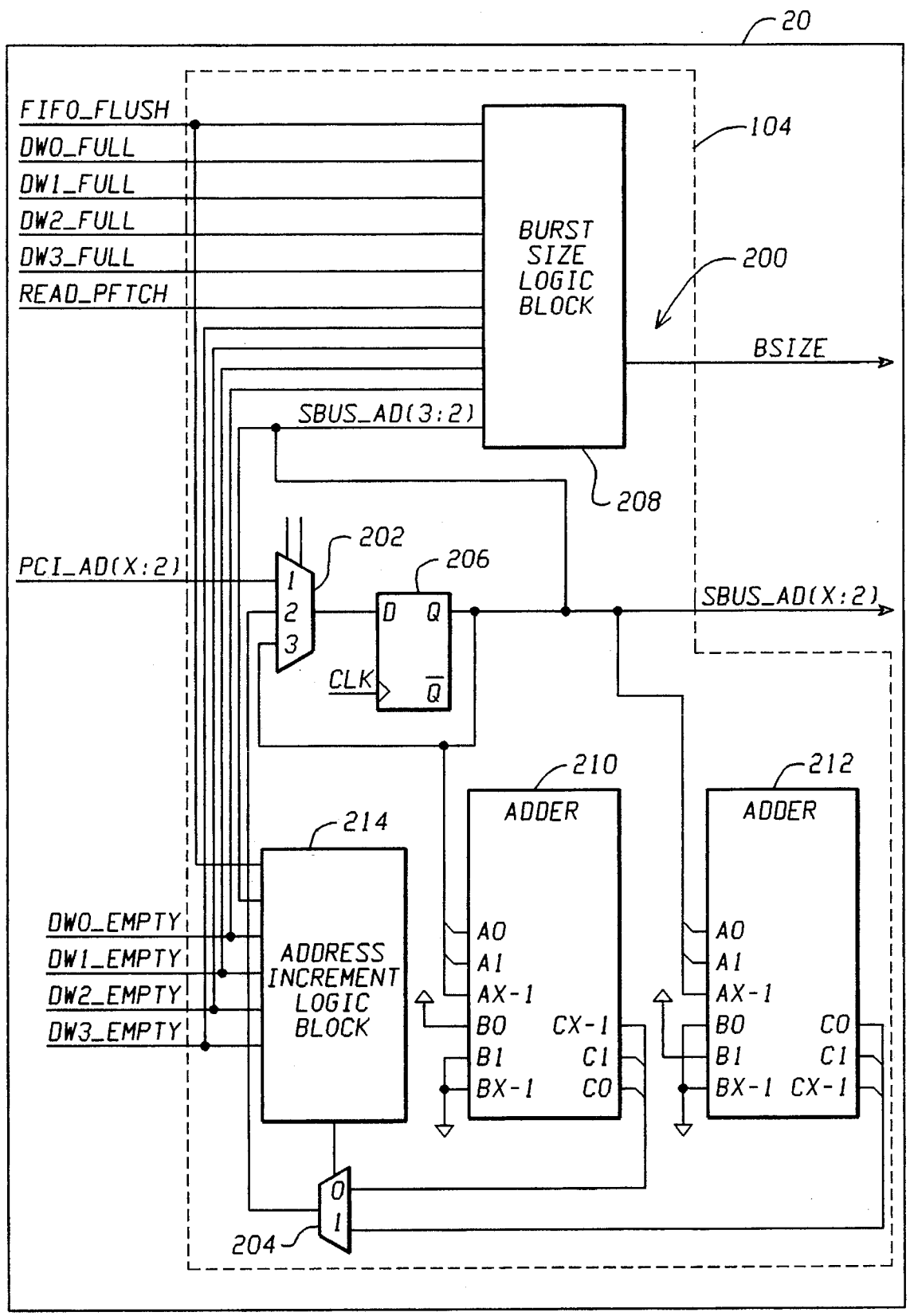
FIG. 8 is a logic diagram of the burst logic of the interface hardware of FIG. 4.

Referring now to FIG. 8, a diagram of burst logic 200 of system bus interface logic 104 is shown. Burst logic 200 optimizes the speed of burst transfers containing non-contiguous data between PCI bus 22 and S-bus 16. Burst logic 200 performs this optimization by detecting a burst transfer of non-contiguous data targeted for S-bus 16, converting the burst transfer to any number of single data transfers required to transfer the non-contiguous data, and bursting the contiguous data that remains. Accordingly, the invention evaluates all of the data that is being transferred during the burst transfer containing non-contiguous data and determines the optimum combination of single transfers and burst transfers that will transfer the data as efficiently as possible. Burst logic 200 also ensures that any burst transfer initiated by a PCI master begins on a correct address boundary within the constraints of the architecture of S-bus 16 while optimizing the speed of all burst transfers on S-bus 16.

Burst logic 200 receives an input signal labeled PCI_AD [X:2] at the first input of a 3-input multiplexor 202. PCI_AD[X:2] is comprised of the lower ordered bits of the PCI address signal that the PCI master transmits on PCI bus 22 during the PCI address phase to initiate a burst transfer targeted to S-bus 16. The bit numbers of the PCI address signal that comprise PCI_AD[X:2] are bit numbers X through 2 (2 is the lowest ordered bit of the address signal). Bit number X is a bit number chosen by the system designer and is based upon the number of PCI data phases that the designer allows to be burst on PCI-bus 22 in any one PCI/system bus data transfer. The designer sets this maximum based on the amount of time the designer allows for any one PCI master to have access to the PCI bus or for other system architecture design reasons.

If burst logic 200 increments this address, as set forth below, such that a bit number ordered higher than bit number X in the initial PCI address signal is altered, then the maximum number of data phases on PCI bus 22 has been exceeded. When this condition occurs, the PCI interface logic 106 will initiate a target disconnect which disallows any data transfer in the bus cycle that follows the PCI data transfer exceeding the maximum number of data phases. Accordingly, the master is disconnected from the host bridge 20. This allows another PCI master to have access to PCI bus 22.

The second input of multiplexor 202 is connected to the output of a 2-input multiplexor 204. The third input of multiplexor 202 is connected to its output of multiplexor 202 through a latch 206 as a feedback input.

The control signals for multiplexor 202 are provided by other hardware logic within host bridge 20. Multiplexor 202 selects its first input to be driven on its output during a PCI address phase that initializes a transfer targeted for S-bus 16. The second input of multiplexor 202 is driven on its output after any data phase on S-bus 16 is complete and an address for the next system bus data phase must be generated. The third input of multiplexor 202 is selected during a system bus data phase or when a data phase on S-bus 16 is complete and the next data phase on S-bus 16 is targeted for the same address as the completed data phase. This latter condition occurs when non-contiguous data within a single DWORD is to be transferred on the S-bus 16 or to accommodate the dynamic bus-sizing capability of S-bus 16. Both of these problems and the inventive hardware used to solve them are disclosed in the co-pending patent application entitled, "METHOD AND APPARATUS FOR PROVIDING ACCURATE AND COMPLETE COMMUNICATION BETWEEN DIFFERENT BUS ARCHITECTURES IN AN INFORMATION HANDLING SYSTEM" assigned to I.B.M. Corporation.

The output of multiplexor 202, after it passes through latch 206, comprises bit numbers X through 2 of the address for the present data phase on S-bus 16. This signal is labeled SBUS_AD[X:2]. SBUS_AD[X:2] is output to system bus interface logic 104. S-bus interface logic 104 combines SBUS_AD[X:2] with the remaining bit numbers of PCI_AD and outputs this combined address value on the address line of S-bus 16 for the present data phase on S-bus 16.

Bit numbers 2 and 3 of SBUS_AD (SBUS_AD[2:3]) are input to a burst size logic block 208. Other inputs to burst size logic block 208 include the DWORDFULL and EMPTY signals from pacing logic 110, the READ_PFTCH signal from prefetch logic 150 and a FIFO_FLUSH signal. FIFO_FLUSH is generated by FIFO buffer logic 102 when PCI bus interface logic indicates that data in the FIFO should be written into the slave on S-bus 16.

The burst size logic block 208 generates an output, BSIZE, based upon the values of the inputs it receives. BSIZE indicates the number of data phases that should be burst on S-bus 16 beginning with the present value of SBUS_AD [2:3]. BSIZE is output to the system bus interface logic 104 which transfers the number of data phases in a burst mode as indicated by BSIZE.

Burst size logic block 208 is a combination of logic that generates the values for BSIZE as set forth in tables 1 and 2 below, based upon whether the burst data transfer is a write operation (Table 1) or a read prefetch operation (Table 2).

TABLE 1

| Burst Size Logic for posted write cycles | | | | | | |
|---|---|---|---|---|---|---|
| FIFO_FLUSH | LB A[3:2] | DW0 FULL | DW1 FULL | DW2 FULL | DW3_FULL | BSIZE |
| 0 | XX | X | X | X | X | X |
| 1 | 00 | 1 | 1 | 1 | 1 | 4 |
| 1 | 00 | 1 | 1 | 1 | 0 | 3 |
| 1 | 00 | 1 | 1 | 0 | 0 | 2 |
| 1 | 10 | X | X | 1 | 1 | 2 |
| 1 | All other FIFO_FLUSH conditions | | | | | 1 |

TABLE 2

| Burst Size Logic for read prefetch cycles (READ_PFTCH=1) | | | | | | |
|---|---|---|---|---|---|---|
| READ_PFTCH | LB_A[3:2] | DW0_EMPTY | DW1_EMPTY | DW2_EMPTY | DW3_EMPTY | BSIZE |
| 0 | XX | X | X | X | X | X |
| 1 | 00 | 1 | 1 | 1 | 1 | 4 |
| 1 | 10 | X | X | 1 | 1 | 2 |
| 1 | All other READ_PFTCH conditions | | | | | 1 |

(X indicates a "Don't Care" Condition)

As the tables indicate, the architecture of S-bus 16 only permits burst transfers beginning on addresses that end with SBUS_AD[2:3] having the value "00" or "10". Moreover, only two burst data transfers are allowed if this value is equal to "10".

Additionally, as table 1 indicates, the DWORD FULL signal of a particular DWORD of data within the FIFO must be high, indicating that all bytes of data within the DWORD are enabled, to burst that DWORD over S-bus 16. This ensures that non-contiguous data will not be burst transferred over S-bus 16.

SBUS_AD[X:2] is also input to two adders, 210 and 212, respectively. Adder 210 increments the value of SBUS_AD[X:2] by one and outputs this new value to the first input of multiplexor 204. Adder 212 increments the value of SBUS_AD[X:2] by two and outputs this new value to the second input of multiplexor 204.

An address increment logic block 214 provides the control signal to multiplexor 204. Address increment logic block 214 receives the DWORD EMPTY signals from pacing logic 110, SBUS_AD[3:2] and FIFO_FLUSH as inputs and generates the control signal for multiplexor 204 based upon these inputs. The control signal output by address increment logic block 214 is either a low or high value based upon the inputs to it as set forth in Table 3 below:

TABLE 3

| CPU Local Bus Address Increment Logic | | | | | | |
|---|---|---|---|---|---|---|
| FIFO_FLUSH | LB A[3:2] | DW0_EMPTY | DW1_EMPTY | DW2_EMPTY | DW3_EMPTY | ADDRESS SELECT |
| 1 | 00 | X | 1 | X | X | 1 |
| 1 | 01 | X | X | 1 | X | 1 |
| 1 | 10 | X | X | X | 1 | 1 |
| 1 | 11 | 1 | X | X | X | 1 |
| All other combinations | | | | | | 0 |

Address increment logic block 214 provides the function of generating Table 3. The purpose of address increment logic block 214 is to skip over a certain address within a burst transfer initiated by a PCI master when the master indicates that no enabled data should be written to that address. When the output from address increment logic block is low, then multiplexor 204 selects the output from adder 210 to be driven on its output. This indicates a normal situation in which the address of the next data transfer on S-bus 16 is simply incremented by one DWORD address. When the output from address increment logic block is high, then multiplexor 204 selects the output from adder 212 to be driven on its output, which causes the address value to be incremented by 2 DWORD addresses. This occurs when the entire next DWORD of data in the FIFO to be written on S-bus 16 is not enabled indicating that the address that this DWORD in the FIFO corresponds to should be skipped in the particular write burst transfer. Thus, no data is written to that address.

In operation, during a write burst transfer to a slave connected to the S-bus 16, bit numbers X through 2 of the first PCI address provided by the PCI master are input to the first input of multiplexor 202. Multiplexor 202 drives this address value on its output because this is the first PCI address phase signalling the start of a PCI burst transfer. Latch 206 latches this value and outputs it for the first SBUS_AD[X:2] value.

SBUS_AD[2:3] is input to burst size logic block 208. Burst size logic block 208 will not generate an output until it receives a high signal for FIFO_FLUSH. When it does receive this high signal, the FIFO will have been filled with write posted data from the PCI master.

When burst size logic 208 does receive the FIFO_FLUSH signal, it evaluates whether the data within each of the DWORDs of the FIFO contain contiguous data based upon the four DWORDFULL signals and also evaluates the SBUS_AD[3:2] signal. Based upon these evaluations, burst size logic will generate a signal for BSIZE.

For example, if bit numbers 2 and 3 have the value "00," FIFO_FLUSH is high and the entire FIFO is full, then BSIZE will be generated having the value of 4. Thus, the system bus interface logic 104 will burst write transfer the 4 DWORDs of data within the FIFO to the slave. This is the maximum burst capability of the S-bus 16, and thus, the fastest possible combination of the signals input to burst size logic block 208. If the write transfer initiated by the master is longer than 4 DWORDs of data, the FIFO will continue to be filled with write-posted data from the master when space becomes available in the FIFO. FIFO_FLUSH will continue to be asserted until every DWORD in the FIFO is empty simultaneously or the PCI bus transaction has completed.

Accordingly, burst size logic block 208 generates the next BSIZE signal based on the incremented value of the bit numbers 2 and 3 of SBUS_AD after a burst on S-bus 16. After a burst of 4 data phases on S-bus 16 this value will again be "00" which again will allow the optimum burst transfer on S-bus 16. This will continue until the burst transfer is complete and FIFO_FLUSH is no longer generated.

In contrast, a burst write transfer may begin on an address in which SBUS AD[2:3] have the value "01". In this situation, because of the limitations of S-bus 16, burst size logic block 208 divides the burst transfer from PCI bus 22 into a single data transfer and a number of burst transfers on S-bus 16. This creates a slower data transfer than the previous example, however, logic block 208 accomplishes the transfer as quickly as possible using the maximum burst capability of S-bus 16.

When FIFO_FLUSH is received, assuming that all DW FULL signals are high, a single data transfer will occur to the address ending in the value "01" because the BSIZE value will be 1. The address will be incremented by one after this transfer by adder 210 as discussed above, and thus, the next value of bit numbers 2 and 3 of SBUS_AD will be "10". Accordingly, BSIZE will become 2 causing a burst transfer of 2 DWORDs on S-bus 16. The address will be incremented twice more because of the previous two DWORD burst transfer. Thus, the new value for SBUS_AD[2:3] will be "00". Burst size logic block 208 will now allow the maximum values for BSIZE, as discussed in the previous example, until the data transfer is completed by the PCI master.

Burst size logic block 208 operates substantially the same way for read prefetching data from an system bus slave as it did for burstwrite operations to a system bus slave. The differences are that the DWORD EMPTY signals are used in place of the DWORD FULL signals, READ_PFTCH is used in place of FIFO_FLUSH and Table 2 is used in place of table 1.

Accordingly, the preferred embodiment of a bus-to-bus bridge for a multiple bus information handling system that optimizes data transfers between a system bus and a peripheral bus has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

We claim:

1. An information handling system, comprising:

a system bus having a slave device attached thereto, said slave device including memory for storing data at sequentially numbered address locations, said system bus permitting burst read operations thereover, wherein a single address is provided during an address phase on the system bus and several data phases occur thereafter, only when the burst read operation begins at one of a plurality of boundaries located at less than all of said sequentially numbered address locations;

a peripheral bus having a master device attached thereto, said master device capable of initiating a burst read operation of data over said peripheral bus, wherein data beginning at any of said sequentially numbered address locations is sequentially read by said master device from a first address location asserted by said master device to a last address location in said slave device; and a host bridge for connecting said peripheral bus to said system bus, said host bridge including system bus interface logic for (i) decoding said first address location asserted by said master device to determine if said first address location corresponds to one of said plurality of boundaries, and if said first address location does not so correspond, (ii) commencing a first read pre-fetch operation by read pre-fetching a first set of data from said slave device, corresponding to data stored at locations beginning with said first address location and ending at one of said plurality of boundaries, and temporarily storing the read pre-fetched first set of data in a buffer, and (iii) commencing a second read pre-fetch operation by read pre-fetching a second set of data from said slave device in a burst read operation, corresponding to data stored at locations beginning and ending at two of said plurality of boundaries, and temporarily storing the read pre-fetched second set of data in said buffer, so that both of said temporarily stored first and second sets of data may be read by said master device over said peripheral bus in a single burst read operation.

2. The system of claim 1, wherein said host bridge further includes logic for issuing a busy signal for indicating that a read pre-fetch operation is presently occurring over said system bus.

3. The system of claim 1, wherein said host bridge further includes logic for clearing said buffer of unnecessarily pre-fetched data, said unnecessarily pre-fetched data comprising data having addresses which are outside of a range defined by said first and last address locations, after said first and second read pre-fetch operations have ceased.

4. The system of claim 3, wherein said host bridge further includes logic for issuing a clear signal to said master device indicating that said buffer is empty.

5. The system of claim 1, wherein said peripheral bus conforms to Peripheral Component Interconnect (PCI) [PCI] bus architecture.

6. The system of claim 1, wherein said system bus can burst up to sixteen bytes of data in a single burst read operation and said peripheral bus can burst more than sixteen bytes of data in a single burst read operation.

7. The system of claim 1, wherein said burst read operation occurring over said peripheral bus occurs over a multiplexed address/data line on said peripheral bus.

8. A method of transferring data in an information handling system, comprising (a) a system bus having a slave device attached thereto, the slave device including memory for storing data at sequentially numbered address locations, the system bus permitting burst read operations thereover, wherein a single address is provided during an address phase on the system bus and several data phases occur thereafter, only when the burst read operation begins at one of a plurality of boundaries located at less than all of the sequentially numbered address locations; (b) a peripheral bus having a master device attached thereto; and (c) a host bridge connecting the system and peripheral buses; said method comprising the steps of:

(i) asserting a first address location with said master device, said master device capable of initiating a burst read operation of data stored in the slave device memory over said peripheral bus, wherein data beginning at any of the sequentially numbered address locations is sequentially read by the master device from said first address location to a last address location in the slave device;

(ii) decoding said first address location asserted by said master device to determine if said first address location corresponds to one of said plurality of boundaries, and if said first address location does not so correspond, (iii) commencing a first read pre-fetch operation by read pre-fetching a first set of data from said slave device, corresponding to data stored at locations beginning with said first address location and ending at one of said plurality of boundaries, and temporarily storing the read pre-fetched first set of data in a buffer, (iv) commencing a second read pre-fetch operation by read pre-fetching a second set of data from said slave device in a burst read operation, corresponding to data stored at locations beginning and ending at two of said plurality of boundaries, and temporarily storing the read pre-fetched second set of data in said buffer, and (v) reading said temporarily stored first and second sets of data with said master device over said peripheral bus in a single burst read operation.

9. The method of claim 8, further comprising the step of issuing a busy signal for indicating that read a pre-fetch operation is presently occurring over said system bus.

10. The method of claim 8, further comprising the step of clearing said buffer of unnecessarily pre-fetched data, said unnecessarily pre-fetched data comprising data having addresses which are outside of a range defined by said first and last address locations, after said first and second read pre-fetch operations have ceased.

11. The method of claim 10, further comprising the step of issuing a clear signal to said master device indicating that said buffer is empty.

12. The method of claim 8, wherein said peripheral bus conforms to Peripheral Component Interconnect (PCI) bus architecture.

13. The method of claim 8, wherein said system bus can burst up to sixteen bytes of data in a single burst read operation and said peripheral bus can burst more than sixteen bytes of data in a single burst read operation.

14. The method of claim 8, wherein said burst read operation occurring over said peripheral bus occurs over a multiplexed address/data line on said peripheral bus.

\* \* \* \* \*

UNITED STATES PATENT AND TRADEMARK OFFICE
CERTIFICATE OF CORRECTION

PATENT NO. : 5,581,714
DATED : December 3, 1996
INVENTOR(S) : Amini, et al.

It is certified that error appears in the above-indentified patent and that said Letters Patent is hereby corrected as shown below:

On the title page, item [54] and column 1, lines 4-8, delete:

"(Bus-to-Bus Bridge for a Multiple Bus Information Handling System that Optimizes Data Transfers Between a System Bus and a Peripheral Bus)"

Signed and Sealed this

Eighteenth Day of February, 1997

Attest:

BRUCE LEHMAN

*Attesting Officer*     *Commissioner of Patents and Trademarks*